(12) United States Patent
McKenzie et al.

(10) Patent No.: US 9,448,687 B1
(45) Date of Patent: Sep. 20, 2016

(54) ZOOMABLE/TRANSLATABLE BROWSER INTERFACE FOR A HEAD MOUNTED DEVICE

(71) Applicant: Google Inc., Mountain View, CA (US)

(72) Inventors: Christopher McKenzie, Brooklyn, NY (US); Hayes Solos Raffle, Palo Alto, CA (US); Nirmal Patel, Sunnyvale, CA (US); Richard The, New York, NY (US); Matthew Tait, Mountain View, CA (US)

(73) Assignee: Google Inc., Mountain View, CA (US)

( * ) Notice: Subject to any disclaimer, the term of this patent is extended or adjusted under 35 U.S.C. 154(b) by 364 days.

(21) Appl. No.: 14/173,714

(22) Filed: Feb. 5, 2014

(51) Int. Cl.
*G06F 3/0481* (2013.01)
*G06F 3/01* (2006.01)

(52) U.S. Cl.
CPC .............. *G06F 3/0481* (2013.01); *G06F 3/011* (2013.01)

(58) Field of Classification Search
CPC ...... G06F 3/0481; G06F 3/017; G06F 1/163; G06F 3/011
See application file for complete search history.

(56) References Cited

U.S. PATENT DOCUMENTS

| | | | |
|---|---|---|---|
| 5,874,954 A * | 2/1999 | Kilmer | G06F 3/0219 707/E17.111 |
| RE42,336 E | 5/2011 | Fateh et al. | |
| 2009/0247234 A1 * | 10/2009 | Kim | G06F 3/041 455/566 |
| 2010/0299630 A1 | 11/2010 | McCutchen et al. | |
| 2011/0115883 A1 | 5/2011 | Kellerman et al. | |
| 2011/0304557 A1 | 12/2011 | Wilburn et al. | |
| 2012/0271545 A1 * | 10/2012 | Cheng | G06F 1/169 701/431 |
| 2013/0139082 A1 | 5/2013 | Wheeler et al. | |
| 2013/0147848 A1 * | 6/2013 | Takahashi | G09G 5/00 345/660 |
| 2013/0342456 A1 * | 12/2013 | Choi | G06F 3/017 345/158 |
| 2014/0002502 A1 * | 1/2014 | Han | G06T 11/60 345/646 |

* cited by examiner

*Primary Examiner* — Li Sun
(74) *Attorney, Agent, or Firm* — McDonnell Boehnen Hulbert & Berghoff LLP

(57) ABSTRACT

A device may be configured to generate a display of a content in a view region. The view region has a given boundary, and the content is provided for display at a first size. The device may be configured to receive a size-adjusting input for adjusting a size of the content. The device may be configured to cause the size of the content to change from the first size to a second size. The device may be configured to receive an indication of ending the size-adjusting operation, and in response to receiving the indication, cause the size of the content to change to a third size that is between the first size and the second size. In addition, or alternative, to receiving the size-adjusting input, the device may also receive a position-adjusting input and, in response, adjust the position and/or size of the content within the given boundary.

17 Claims, 29 Drawing Sheets

FIGURE 4

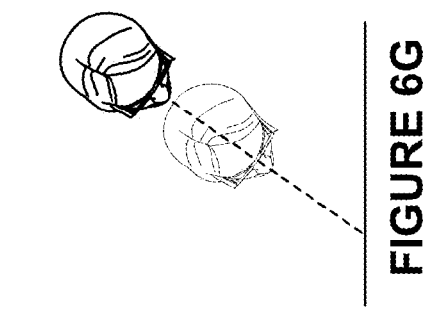
FIGURE 6A
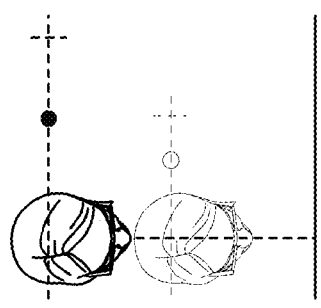
FIGURE 6B
DOLLY BASED ON CENTER OF FOCUS
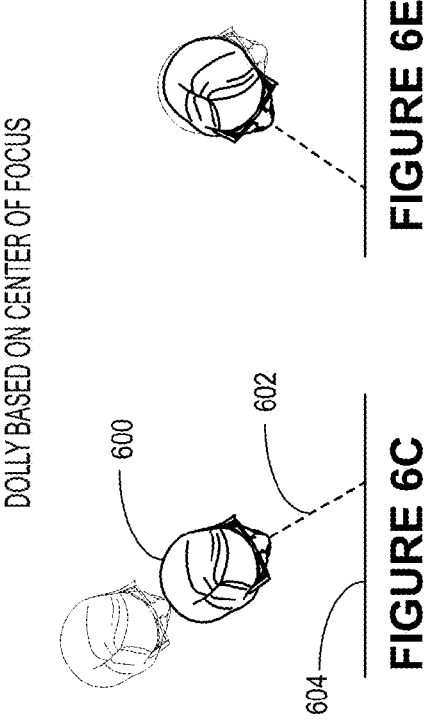
FIGURE 6C
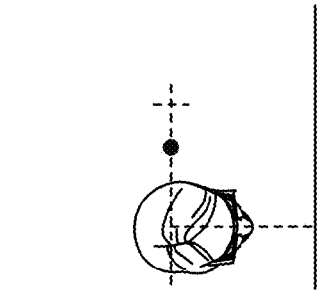
ORTHOGRAPHIC INTERPRETATION
FIGURE 6D
FIGURE 6E
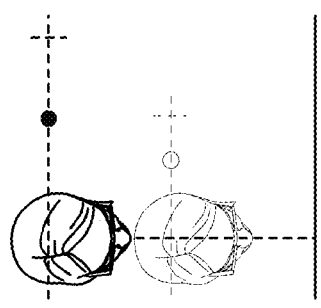
FIGURE 6F
FIGURE 6G
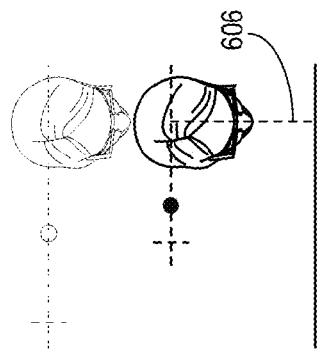
FIGURE 6H
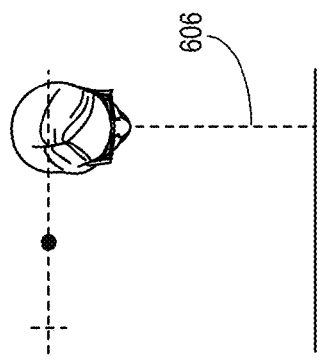
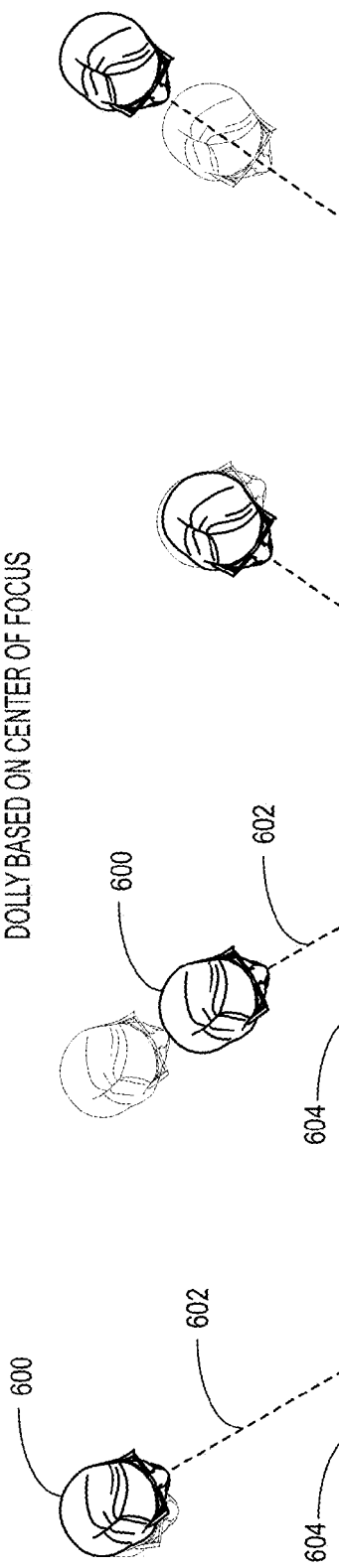

DEFAULT HOVER STATE
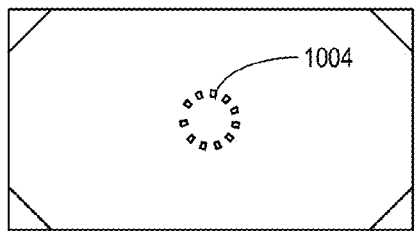
FIGURE 15A
LINK HOVER STATE
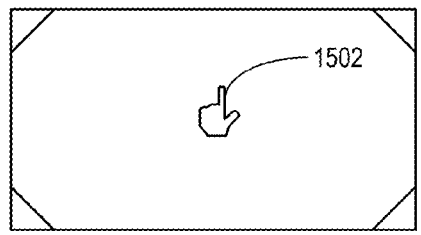
FIGURE 15B
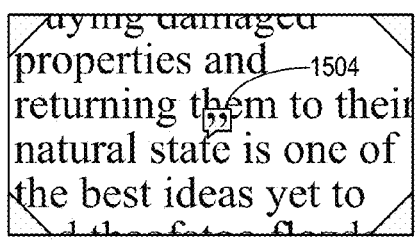
RELEASE TOUCH PAD →
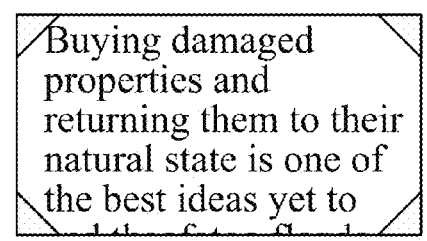
FIGURE 15C  FIGURE 15D
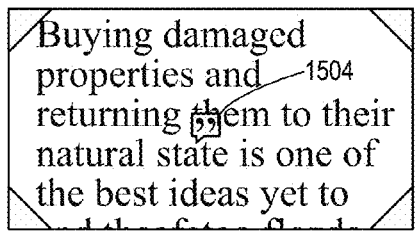
TAP →
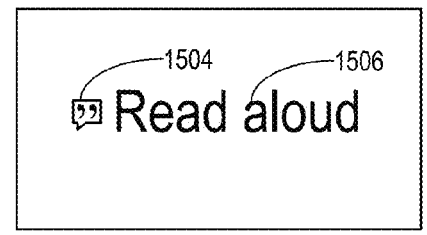
FIGURE 15E  FIGURE 15F
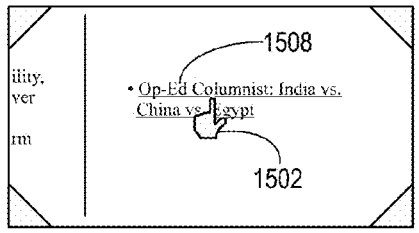
TAP →
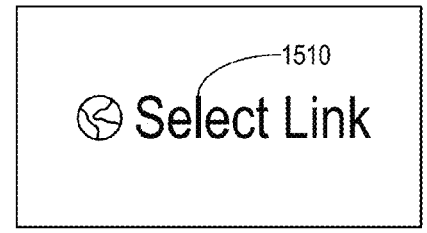
FIGURE 15G  FIGURE 15H

ZOOMABLE/TRANSLATABLE BROWSER INTERFACE FOR A HEAD MOUNTED DEVICE

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a graphic display close enough to a wearer's (or user's) eye(s) such that the displayed image appears as a normal-sized image, such as might be displayed on a traditional image display device. The relevant technology may be referred to as "near-eye displays."

Wearable computing devices with near-eye displays may also be referred to as "head-mountable displays" (HMDs), "head-mounted displays," "head-mounted devices," or "head-mountable devices." A head-mountable display places a graphic display or displays close to one or both eyes of a wearer. To generate the images on a display, a computer processing system may be used. Such displays may occupy a wearer's entire field of view, or only occupy part of wearer's field of view. Further, head-mounted displays may vary in size, taking a smaller form such as a glasses-style display or a larger form such as a helmet, for example.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming. Many other applications are also possible.

SUMMARY

The present disclosure describes embodiments that relate to a browser interface for a head-mounted device. In one aspect, the present disclosure describes a method. The method comprises generating a display of a content in a view region associated with a computing device. The view region has a given boundary, and the content is provided for display at a first size. The method also comprises receiving a size-adjusting input relating to a size-adjusting operation for adjusting a size of the content. The method further comprises, in response to receiving the size-adjusting input, causing the size of content to change from the first size to a second size. The content in the second size may occupy a region that is (i) smaller than the given boundary of the view region, or (ii) larger than the given boundary of the view region such that a portion of the content is beyond the given boundary of the view region and is not rendered. The method also comprises receiving an indication of ending the size-adjusting operation. The method further comprises, in response to receiving the indication, causing the size of the content to change to a third size that is between the first size and the second size.

In another aspect, the present disclosure describes a non-transitory computer readable medium having stored thereon instructions that, when executed by a computing device, cause the computing device to perform functions. The functions comprise generating a display of a content in a view region associated with the computing device. The view region has a given boundary, and the content is provided for display at a first position. The functions also comprise receiving a position-adjusting input relating to a position-adjusting operation for adjusting a position of the content relative to the view region. Adjusting the position comprises adjusting at least one of a horizontal position and a vertical position of the content relative to the view region. The functions further comprise, in response to receiving the position-adjusting input, causing the position of the content to change from a first position to a second position. The content in the second position may occupy a region such that a respective portion of the content is beyond the given boundary of the view region and is not rendered. The functions also comprise receiving an indication of ending the position-adjusting operation. The functions further comprise, in response to receiving the indication, causing the position of the content to change to a third position.

In still another aspect, the present disclosure describes a device. The device comprises at least one processor; and data storage comprising instructions that, when executed by the at least one processor, cause the system to perform functions. The functions comprise generating a display of a content in a view region associated with the device. The view region has a given boundary, and the content is provided for display at a first size. The functions also comprise receiving a size-adjusting input relating to a size-adjusting operation for adjusting a size of the content. The functions also comprise, in response to receiving the size-adjusting input, causing the size of the content to change from the first size to a second size. The content in the second size may occupy a region that is (i) smaller than the given boundary of the view region, (ii) or larger than the given boundary of the view region such that a portion of the content is beyond the given boundary of the view region and is not displayed. The functions further comprise receiving an indication of ending the size-adjusting operation. The functions also comprise, in response to receiving the indication, causing the size of the content to change to a third size that is between the first size and the second size.

In still another aspect, the present disclosure describes a device. The device comprises a means for generating a display of a content in a view region associated with the device, where the view region has a given boundary, and where the content is provided for display at a first size. The device also comprises a means for receiving a size-adjusting input relating to a size-adjusting operation for adjusting a size of the content. The device further comprises a means for, in response to receiving the size-adjusting input, causing the size of the content to change from the first size to a second size, where the content in the second size occupies a region that is (i) smaller than the given boundary of the view region, or (ii) larger than the given boundary of the view region such that a portion of the content is beyond the given boundary of the view region and is not rendered. The device also comprises a means for receiving an indication of ending the size-adjusting operation. The device further comprises a means for, in response to receiving the indication, causing the size of the content to change to a third size that is between the first size and the second size.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 4 illustrates a content displayed at a first size, in accordance with an example embodiment.

FIGS. 6A-6H illustrate orthographic interpretation to prevent distortion of a display of a content, in accordance with an example embodiment.

FIG. 7A illustrates the content in a second size occupying a region that is smaller than the given boundary of the view region, in accordance with an example embodiment.

FIGS. 14D-14E illustrate animating a reticle to indicate size-adjusting state, in accordance with an example embodiment.

DETAILED DESCRIPTION

Figure 1A:
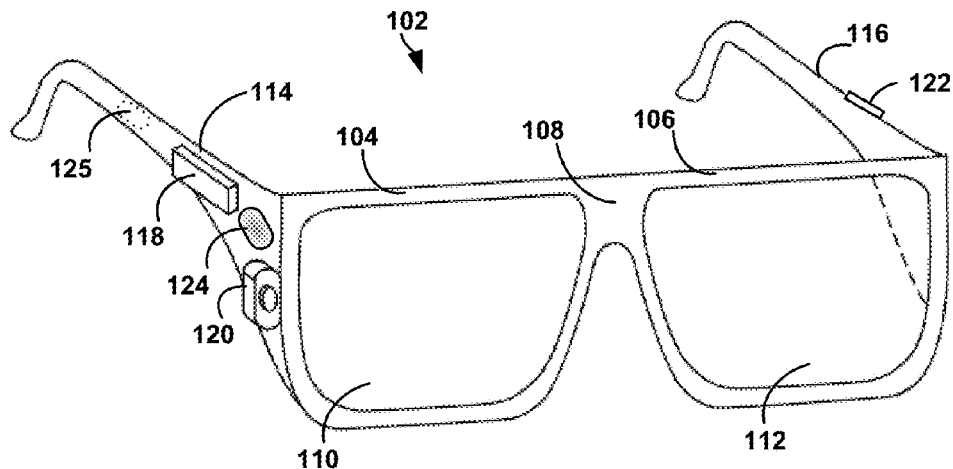
FIG. 1A illustrates a wearable computing system, in accordance with an example embodiment.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

Example graphical user interfaces (GUIs) provide information and/or allow for user interaction in two dimensions. The two dimensions can be identified as the X dimension and the Y dimension, where the X dimension is for horizontal or left-right movement, and Y dimension is for vertical or up-down movement. These interactions in the X and Y dimensions enable movement in a two-dimensional or XY display.

In an example, use of a third or Z dimension for depth, can make GUIs more intuitive and easier to use. For example, a user interface (UI) action associated with "moving toward" a wearer of an Head-Mounted Display (HMD) can be associated with "increasing" a parameter/value. Similarly, a UI action associated with "move away from" a wearer of an HMD can be associated with "decreasing" a parameter/value. To simulate Z axis operations, increasing the size of an object in an XY display can simulate bringing the object closer, while decreasing the size of an object in the XY display can simulate moving away from the object.

Thus, using the third dimension can permit zooming out, or decreasing the size of, and zooming in, or increasing the size of content displayed on an HMD. Zooming out in this case may refer to simulating moving the content displayed on an HMD away from the wearer. Similarly, zooming in may refer to simulating moving the content closer to the wearer. Thus, zooming in an out may refer to Z-translation of the content. As the wearer zooms in on a portion of the content, the portion can be thought to be brought closer to a wearer of the HMD and occupy most or all of the wearer's display, for example.

In examples, the HMD can be configured with a UI controller receiving inputs from at least a touch-based UI. The touch-based UI can include one or more hand-movement input devices that are configured to receive various hand movements, such as one-finger swipes in various directions, two-finger or multi-finger swipes in various directions, taps, button presses of various durations, and button releases, and generate corresponding hand-movement data.

In some examples, Z-axis oriented movement within an HMD display can be performed by a wearer performing swipe toward, and/or swipe away operations using one or more fingers on the touch pad of the HMD. For example, a swipe toward can be a movement of the one or more fingers on the touch pad in a direction toward a display plane shown in front of an eye of a wearer, while a swipe away can be a movement of the one or more fingers on the touch pad in a direction away from the display plane.

A computing device may be configured to receive an input associated with a hand-movement input device and may be configured to adjust a size of the content accordingly. For example, a two-finger swipe forward can be interpreted as moving away, and a two-finger swipe backward can be interpreted as moving toward. In some scenarios, a two-finger swipe backward can be used to zoom in on a portion of the content and a two-finger swipe forward can be used to zoom out from the content.

In examples, in addition to an input associated with the hand-movement input device to zoom in or out of a content, the computing device may be configured to receive other inputs associated with head-movement of the wearer. The computing device may be configured to interpret such input as a request to pan or scroll through the content. For instance, the computing device may be configured to interpret a head-movement to the right to be a request to pan to the right of the content.

The computing device may be configured to provide a view region on the HMD, where the view region includes the content. As an example for illustration, the view region may comprise a square area having left, right, top, and bottom boundaries. The computing device may be configured to utilize individual or combined inputs associated with the hand-movement input device and head-movement as requests to traverse or navigate through a display of a content, e.g., content displayed on the HMD. The combined inputs may simulate three-dimensional motion of the content, where the content can be brought closer or further while the content is moving rightward, leftward, downward, or upward or a combination thereof relative to the view region.

In examples, as a result of navigating the content, the content may occupy a region that is smaller than the view region, or the computing device may be configured to cause a portion of the content to be beyond the given boundary of the view region. As an example, the content may include a webpage or a portion of the webpage. The computing device may be configured to receive navigation requests that result in the webpage moving to the left such that a portion on the left edge of the webpage is beyond a left boundary of the view region (and thus that portion is unseen). In this example, the right edge of the webpage may not be aligned with the right boundary of the view region, but a gap may separate the right edge of the webpage from the right boundary of the view region.

In another example, the navigation requests may cause zooming out of the webpage such that the entire webpage is contained within the view region and respective gaps separate the boundaries of the view region and the edges of the webpage, i.e., a size of the webpage has changed from a first size to a second size smaller than the first size. In this example, the computing device may be configured to receive an indication of the wearer releasing their fingers from the hand-movement input device, and upon receiving the indication of release, the computing device may cause the content to "bounce" so that a size of the content is adjusted to a third size where the content substantially occupies the view region. Bouncing the content indicate animating the content and may simulate a spring exerting a force on the content to pull the content that is zoomed out or push the content that is zoomed in to substantially occupy the entire view region. For instance, the amount of virtual force exerted by the virtual spring on the content may be proportional to a distance from a center of the content to a center of the view region.

As an example, suppose a wearer of an HMD is viewing a content at a first size. Then, the wearer performs operation(s) to zoom in and/or zoom out of the content so that the content is displayed at a second size. Subsequent to the content being displayed at a second size, the wearer provides an indication of release to the HMD and the content is bounced to be displayed at a third size. The third size may be substantially equal to the first size, for example, such that the bounce causes the content to resume its original size prior to beginning of operation(s) to change its size based on the zoom request. However, in other examples, the third size may be between the first size and the second size (e.g., the nearest size within a given boundary). For instance, the third size may be larger than the second size but smaller than the first size.

In an example, releasing the hand-movement input device may comprise the computing device receiving an indication that the hand-movement input device has not been used for a predetermined amount to time. In another example, the wearer may make a gesture (e.g., tap on the hand-movement input device) to indicate a release of the hand-movement input device.

II. EXAMPLE WEARABLE COMPUTING DEVICES

Systems and devices in which example embodiments may be implemented will now be described in greater detail. In general, an example system may be implemented in or may take the form of a wearable computer (also referred to as a wearable computing device). In an example embodiment, a wearable computer takes the form of or includes a head-mountable device (HMD).

An example system may also be implemented in or take the form of other devices, such as a mobile phone, among other possibilities. Further, an example system may take the form of non-transitory computer readable medium, which has program instructions stored thereon that are executable by at a processor to provide the functionality described herein. An example system may also take the form of a device such as a wearable computer or mobile phone, or a subsystem of such a device, which includes such a non-transitory computer readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

FIG. 1A illustrates a wearable computing system according to an example embodiment. In FIG. 1A, the wearable computing system takes the form of a head-mountable device (HMD) 102 (which may also be referred to as a head-mounted display). It should be understood, however, that example systems and devices may take the form of or be implemented within or in association with other types of devices, without departing from the scope of the invention. As illustrated in FIG. 1A, the HMD 102 includes frame elements including lens-frames 104, 106 and a center frame support 108, lens elements 110, 112, and extending side-arms 114, 116. The center frame support 108 and the extending side-arms 114, 116 are configured to secure the HMD 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the HMD 102 to the user. The extending side-arms 114, 116 may further secure the HMD 102 to the user by extending around a rear portion of the user's head. Additionally or alternatively, for example, the HMD 102 may connect to or be affixed within a head-mounted helmet structure. Other configurations for an HMD are also possible.

The HMD 102 may also include an on-board computing system 118, an image capture device 120, a sensor 122, and a finger-operable touch pad 124. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example. The on-board computing system 118 may be configured to receive and analyze data from the image capture device 120 and the finger-operable touch pad 124 (and possibly from other sensory devices, user interfaces, or both) and generate images for output by the lens elements 110 and 112.

The image capture device 120 may be, for example, a camera that is configured to capture still images and/or to capture video. In the illustrated configuration, image capture device 120 is positioned on the extending side-arm 114 of the HMD 102; however, the image capture device 120 may be provided on other parts of the HMD 102. The image capture device 120 may be configured to capture images at various resolutions or at different frame rates. Many image capture devices with a small form-factor, such as the cameras used in mobile phones or webcams, for example, may be incorporated into an example of the HMD 102.

Further, although FIG. 1A illustrates one image capture device 120, more image capture device may be used, and each may be configured to capture the same view, or to capture different views. For example, the image capture device 120 may be forward facing to capture at least a portion of the real-world view perceived by the user. This forward facing image captured by the image capture device 120 may then be used to generate an augmented reality where computer generated images appear to interact with or overlay the real-world view perceived by the user.

The sensor 122 is shown on the extending side-arm 116 of the HMD 102; however, the sensor 122 may be positioned on other parts of the HMD 102. For illustrative purposes, only one sensor 122 is shown. However, in an example embodiment, the HMD 102 may include multiple sensors. For example, an HMD 102 may include sensors 102 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touch pad 124 is shown on the extending side-arm 114 of the HMD 102. However, the finger-operable touch pad 124 may be positioned on other parts of the HMD 102. Also, more than one finger-operable touch pad may be present on the HMD 102. The finger-operable touch pad 124 may be used by a user to input commands. The finger-operable touch pad 124 may sense at least one of a pressure, position and/or a movement of one or more fingers via capacitive sensing, resistance sensing, or a surface acoustic wave process, among other possibilities. The finger-operable touch pad 124 may be capable of sensing movement of one or more fingers simultaneously, in addition to sensing movement in a direction parallel or planar to the pad surface, in a direction normal to the pad surface, or both, and may also be capable of sensing a level of pressure applied to the touch pad surface. In some embodiments, the finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

In a further aspect, HMD 102 may be configured to receive user input in various ways, in addition or in the alternative to user input received via finger-operable touch pad 124. For example, on-board computing system 118 may implement a speech-to-text process and utilize a syntax that maps certain spoken commands to certain actions. In addition, HMD 102 may include one or more microphones via which a wearer's speech may be captured. Configured as such, HMD 102 may be operable to detect spoken commands and carry out various computing functions that correspond to the spoken commands.

As another example, HMD 102 may interpret certain head-movements as user input. For example, when HMD 102 is worn, HMD 102 may use one or more gyroscopes and/or one or more accelerometers to detect head movement. The HMD 102 may then interpret certain head-movements as being user input, such as nodding, or looking up, down, left, or right. An HMD 102 could also pan or scroll through graphics in a display according to movement. Other types of actions may also be mapped to head movement.

As yet another example, HMD 102 may interpret certain gestures (e.g., by a wearer's hand or hands) as user input. For example, HMD 102 may capture hand movements by analyzing image data from image capture device 120, and initiate actions that are defined as corresponding to certain hand movements.

As a further example, HMD 102 may interpret eye movement as user input. In particular, HMD 102 may include one or more inward-facing image capture devices and/or one or more other inward-facing sensors (not shown) sense a user's eye movements and/or positioning. As such, certain eye movements may be mapped to certain actions. For example, certain actions may be defined as corresponding to movement of the eye in a certain direction, a blink, and/or a wink, among other possibilities.

HMD 102 also includes a speaker 125 for generating audio output. In one example, the speaker could be in the form of a bone conduction speaker, also referred to as a bone conduction transducer (BCT). Speaker 125 may be, for example, a vibration transducer or an electroacoustic transducer that produces sound in response to an electrical audio signal input. The frame of HMD 102 may be designed such that when a user wears HMD 102, the speaker 125 contacts the wearer. Alternatively, speaker 125 may be embedded within the frame of HMD 102 and positioned such that, when the HMD 102 is worn, speaker 125 vibrates a portion of the frame that contacts the wearer. In either case, HMD 102 may be configured to send an audio signal to speaker 125, so that vibration of the speaker may be directly or indirectly transferred to the bone structure of the wearer. When the vibrations travel through the bone structure to the bones in the middle ear of the wearer, the wearer can interpret the vibrations provided by BCT 125 as sounds.

Various types of bone-conduction transducers (BCTs) may be implemented, depending upon the particular implementation. Generally, any component that is arranged to vibrate the HMD 102 may be incorporated as a vibration transducer. Yet further it should be understood that an HMD 102 may include a single speaker 125 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 125 can vibrate the wearer's bone structure.

Figure 1B:
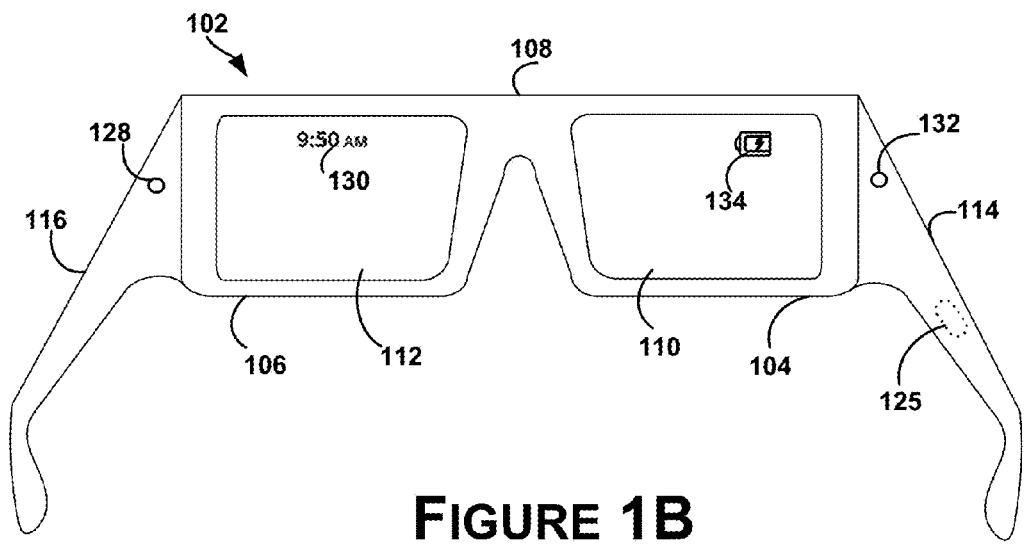
FIG. 1B illustrates an alternate view of the wearable computing device illustrated in FIG. 1A, in accordance with an example embodiment.

FIG. 1B illustrates an alternate view of the wearable computing device illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
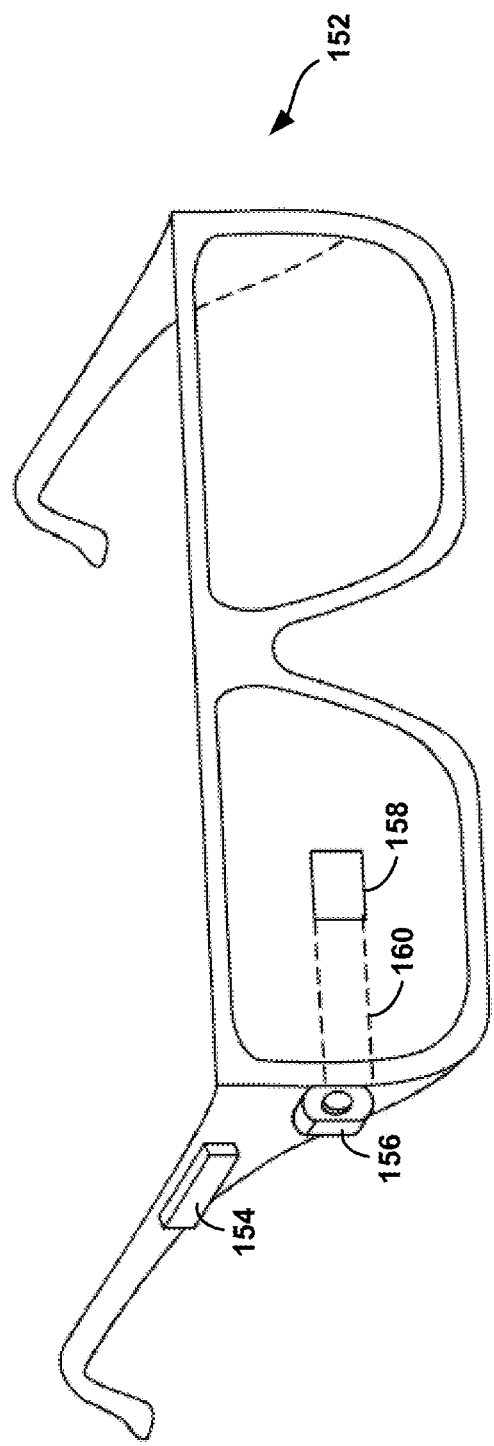
FIG. 1C illustrates another wearable computing system, in accordance with an example embodiment.

FIG. 1C illustrates another wearable computing system according to an example embodiment, which takes the form of an HMD 152. The HMD 152 may include frame elements and side-arms such as those described with respect to FIGS. 1A and 1B. The HMD 152 may additionally include an on-board computing system 154 and an image capture device 156, such as those described with respect to FIGS. 1A and 1B. The image capture device 156 is shown mounted on a frame of the HMD 152. However, the image capture device 156 may be mounted at other positions as well.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions, such as for example towards either the upper or lower portions of the wearer's field of view. The display 158 is controllable via the computing system 154 that is coupled to the display 158 via an optical waveguide 160.

Figure 1D:
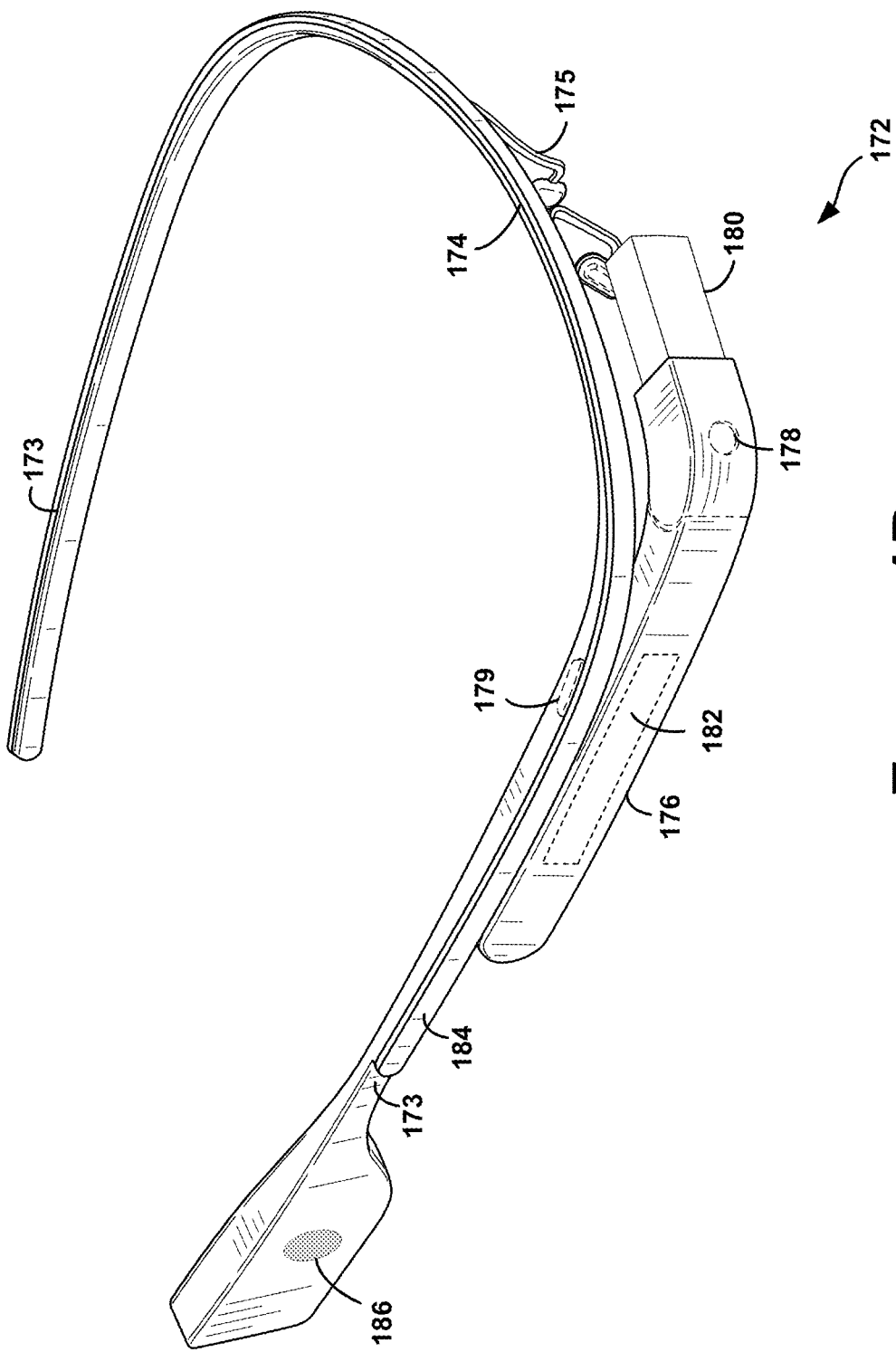
FIG. 1D illustrates another wearable computing system, in accordance with an example embodiment.

FIG. 1D illustrates another wearable computing system according to an example embodiment, which takes the form of a monocular HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD.

The HMD 172 may include a single display 180, which may be coupled to one of the side-arms 173 via the component housing 176. In an example embodiment, the display 180 may be a see-through display, which is made of glass and/or another transparent or translucent material, such that the wearer can see their environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye, when HMD 172 is being worn. HMD 172 also includes a touch pad 182 (e.g., similar to the finger-operable touch pad 124) and a BCT 186.

In a further aspect, HMD 172 may include a sliding feature 184, which may be used to adjust the length of the side-arms 173. Thus, sliding feature 184 may be used to adjust the fit of HMD 172. Further, an HMD may include other features that allow a wearer to adjust the fit of the HMD, without departing from the scope of the invention.

Figure 1E:
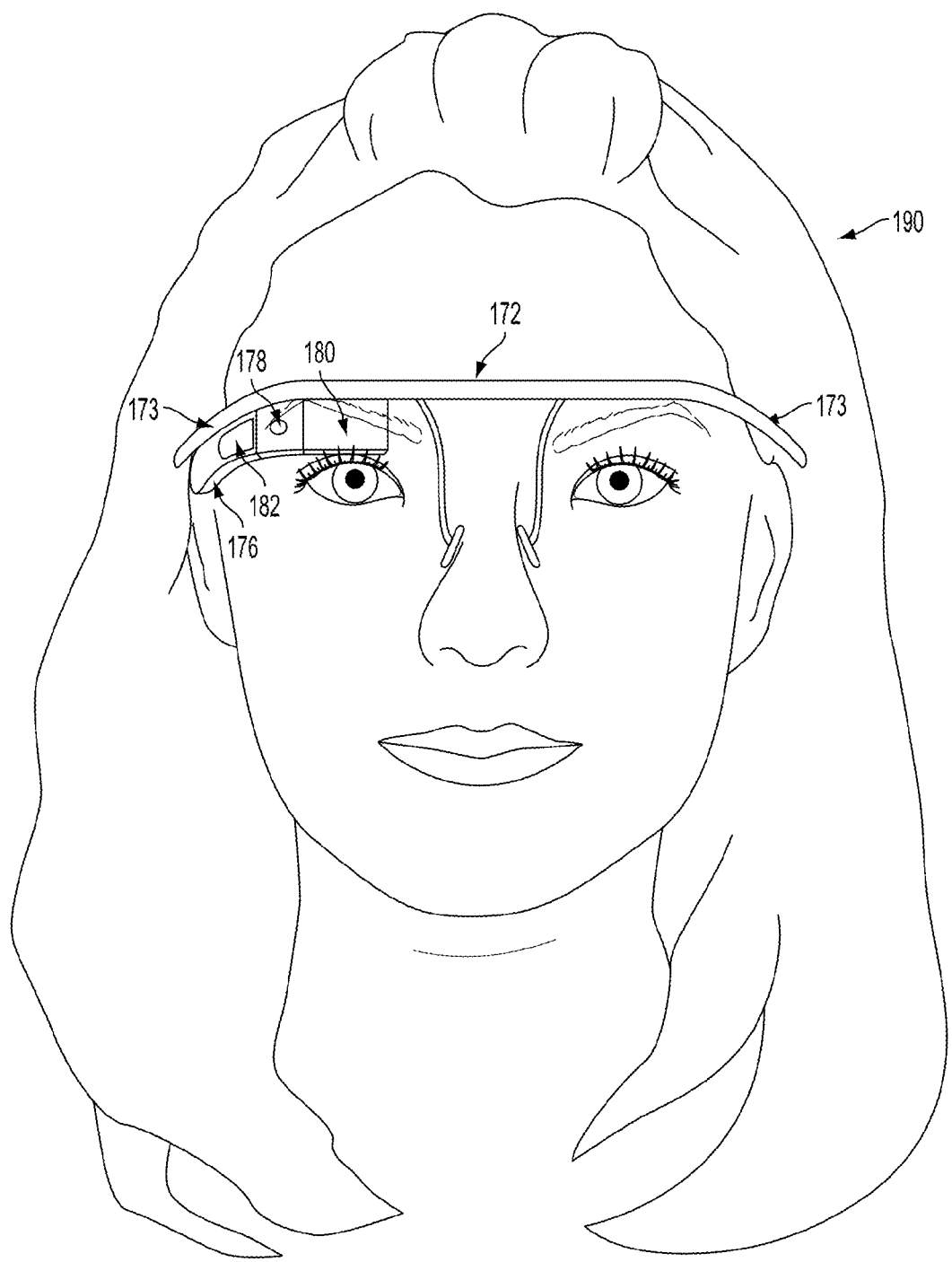
FIGS. 1E to 1G are simplified illustrations of the wearable computing system shown in FIG. 1D, being worn by a wearer, in accordance with example embodiments.
Figure 1F:
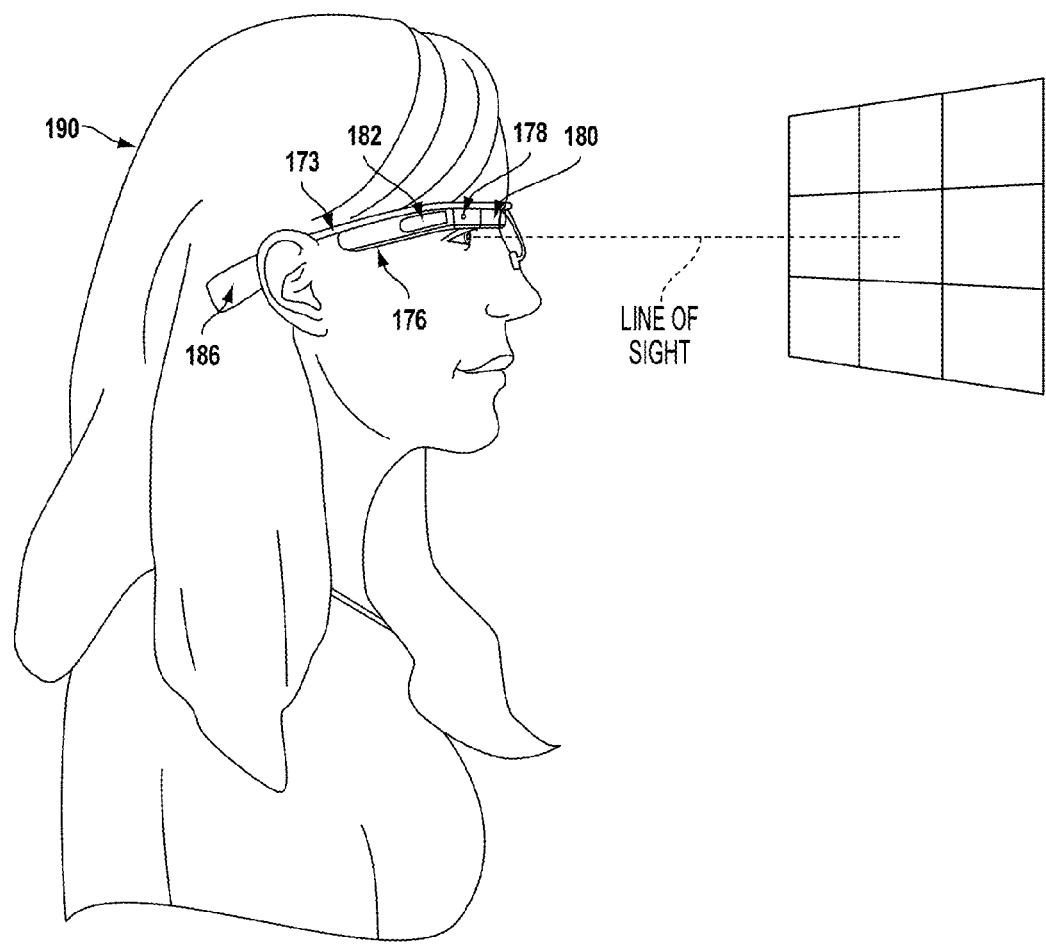
Figure 1G:
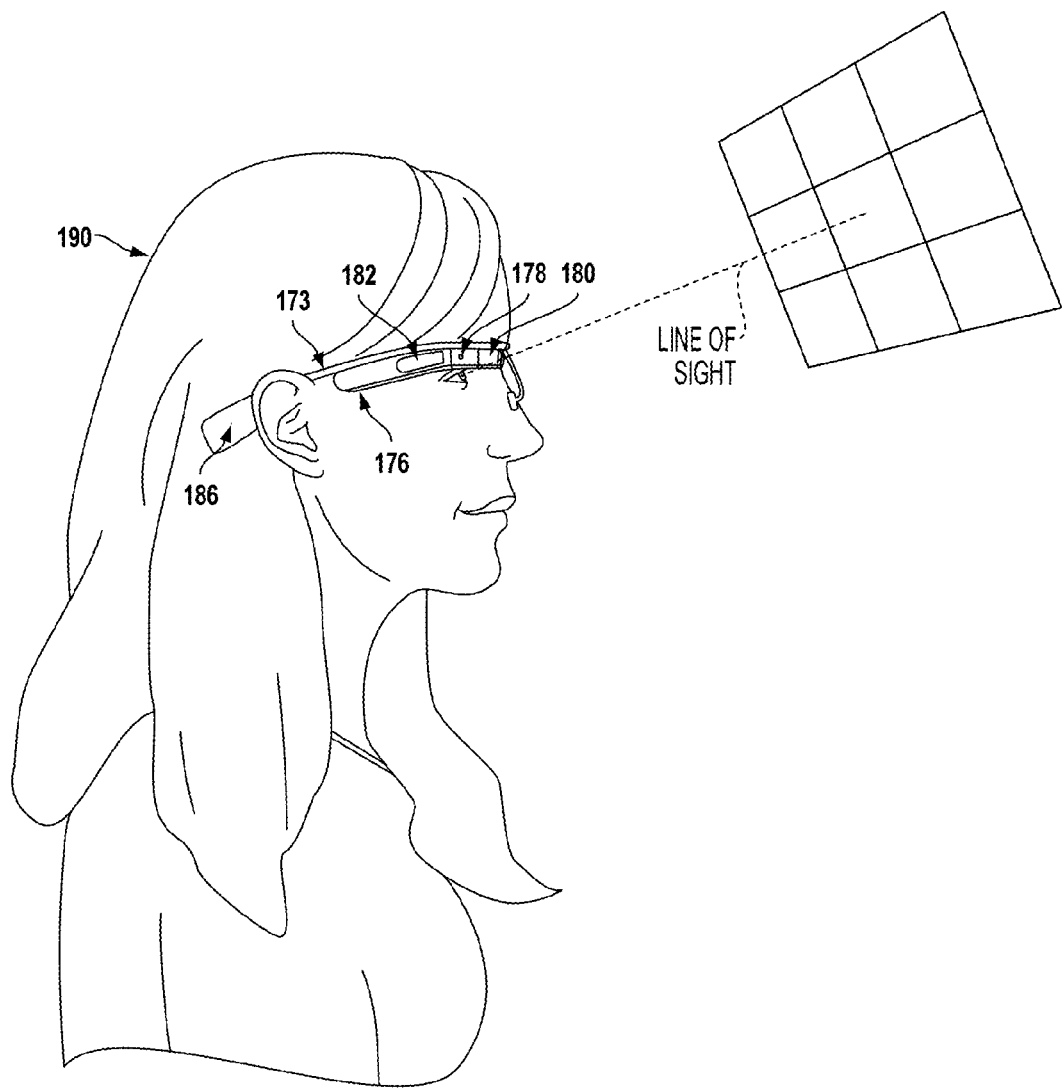

FIGS. 1E to 1G are simplified illustrations of the HMD 172 shown in FIG. 1D, being worn by a wearer 190. As shown in FIG. 1F, when HMD 172 is worn, BCT 186 is arranged such that when HMD 172 is worn, BCT 186 is located behind the wearer's ear. As such, BCT 186 is not visible from the perspective shown in FIG. 1E.

In the illustrated example, the display 180 may be arranged such that when HMD 172 is worn, display 180 is positioned in front of or proximate to a user's eye when the HMD 172 is worn by a user. For example, display 180 may be positioned below the center frame support and above the center of the wearer's eye, as shown in FIG. 1E. Further, in the illustrated configuration, display 180 may be offset from the center of the wearer's eye (e.g., so that the center of display 180 is positioned to the right and above of the center of the wearer's eye, from the wearer's perspective).

Configured as shown in FIGS. 1E to 1G, display 180 may be located in the periphery of the field of view of the wearer 190, when HMD 172 is worn. Thus, as shown by FIG. 1F, when the wearer 190 looks forward, the wearer 190 may see the display 180 with their peripheral vision. As a result, display 180 may be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 180 is located as shown, the wearer 190 may view the display 180 by, e.g., looking up with their eyes only (possibly without moving their head). This is illustrated as shown in FIG. 1G, where the wearer has moved their eyes to look up and align their line of sight with display 180. A wearer might also use the display by tilting their head down and aligning their eye with the display 180.

Figure 2A:
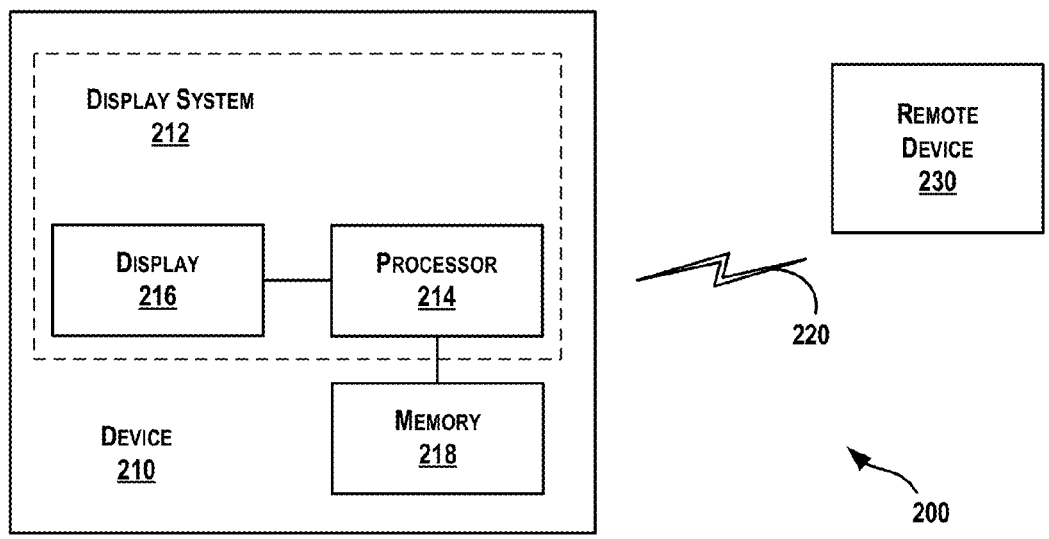
FIG. 2A is a simplified block diagram of a computing device, in accordance with an example embodiment.

FIG. 2A is a simplified block diagram a computing device 210 according to an example embodiment. In an example embodiment, device 210 communicates using a communication link 220 (e.g., a wired or wireless connection) to a remote device 230. The device 210 may be any type of device that can receive data and display information corresponding to or associated with the data. For example, the device 210 may take the form of or include a head-mountable display, such as the head-mounted devices 102, 152, or 172 that are described with reference to FIGS. 1A to 1G.

The device 210 may include a display system 212 comprising a processor 214 and a display 216. The display 216 may be, for example, an optical see-through display, an optical see-around display, or a video see-through display. The processor 214 may receive data from the remote device 230, and configure the data for display on the display 216. The processor 214 may be any type of processor, such as a micro-processor or a digital signal processor, for example.

The device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, head-mountable display, tablet computing device, etc., that is configured to transmit data to the device 210. The remote device 230 and the device 210 may contain hardware to enable the communication link 220, such as processors, transmitters, receivers, antennas, etc.

Further, remote device 230 may take the form of or be implemented in a computing system that is in communication with and configured to perform functions on behalf of client device, such as computing device 210. Such a remote device 230 may receive data from another computing device 210 (e.g., an HMD 102, 152, or 172 or a mobile phone), perform certain processing functions on behalf of the device 210, and then send the resulting data back to device 210. This functionality may be referred to as "cloud" computing.

In FIG. 2A, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.).

Figure 2B:
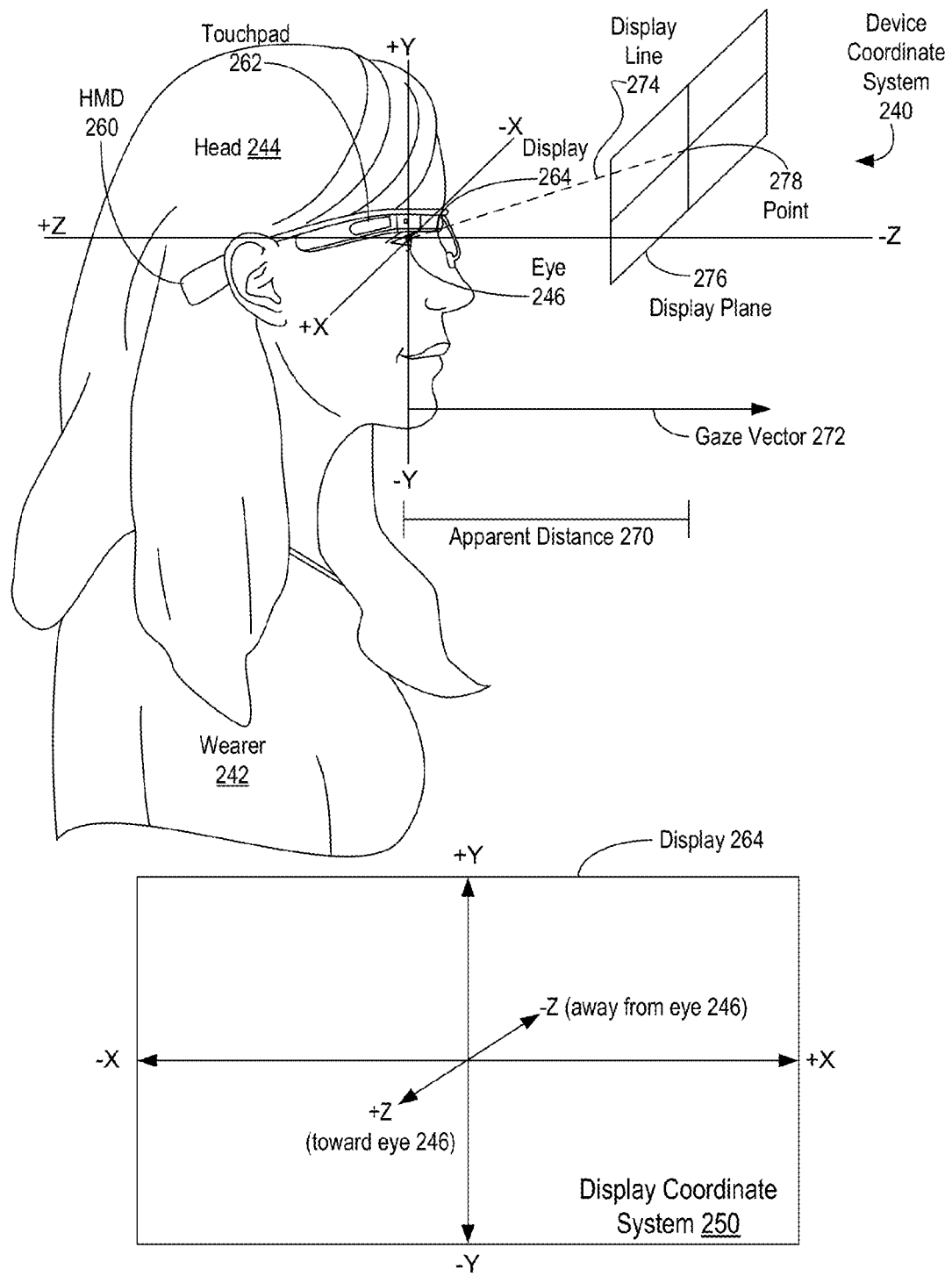
FIG. 2B shows a projection of an image by a head-mountable device, in accordance with an example embodiment.

FIG. 2B shows an example device coordinate system 240 and corresponding display coordinate system 250 in accordance with an embodiment. The device coordinate system 250 is used herein: when HMD 260 is level and upright on head 244 of wearer 242 with display 264 facing eye 246 of wearer 242, as shown in FIG. 2B, +X is right, +Y is up, and +Z is towards eye 246 (with respect to display 264) such that forward is −Z. In Figures showing the YZ plane, +X is toward the reader and −X is away from the reader in device coordinates. In terms of device coordinates, a swipe toward (sometimes termed swipe backward or swipe left) can involve a swipe, or movement by one or more fingers touching the touch pad, in the +Z direction. In device coordinates, a swipe away (sometimes termed swipe forward or swipe right) can involve swiping in the −Z direction.

Device coordinate system 240 can be used to specify a coordinate system for images shown in eye 246 of wearer 242 using display 264. FIG. 2B shows display coordinate system 250 for displaying images using display 264 as viewed by wearer 242. As shown in FIG. 2B, when HMD 260 is level and upright on head 244 with display 264 facing eye 246, +X in device coordinate system 250 is right along display 264, +Y in device coordinate system 250 is up with respect to display 264, and +Z in display coordinate system 250 is towards eye 246. For example, for fixed X and Y components in display coordinate system 250 objects shown on display 264 with a Z component of Z1 can appear to be larger to wearer 242 than objects having a Z component of Z2, where Z1>Z2. That is, as Z coordinates increase in display coordinate system 260, image displayed in display 264 using display coordinate system 250 appear increasingly larger up to the limits of display 264. In some embodiments, a two-dimensional display system can use coordinates of display coordinate system with a fixed Z component; e.g., Z=0. Unless specifically stated otherwise, X, Y, and Z components are specified below using display coordinate system 250.

HMD 260 can project an image in display plane 276 for view by wearer 242 at some apparent distance 270 along display line 274. For example, apparent distance 270 can be 1 meter, four feet, infinity, or some other distance. Display line 274 can be based on gaze vector 272. Gaze vector 272 tracks wearer 242's gaze, or direction of viewing. In FIG. 2B, wearer 242 is looking directly in the −Z direction, and thus gaze vector 272 is a vector along the −Z axis. For the sake of viewability, FIG. 2B shows gaze vector 272 below eye 246.

In an example shown in FIG. 2B, display line 274 can be directed to be above and to the right of gaze vector 272. Then, an image can be projected at display plane 276 that is perpendicular to display line 274 and includes at least point 278 where display line 274 is at apparent distance 270 from wearer 242. The image can be displayed in display plane 276 projected above and to the right of gaze vector 272; e.g., the image can be displayed as centered at point 278. Then, wearer 242 can look at a person or object along gaze vector 272 without the displayed image obscuring their gaze. In one example, the display element of the HMD 260 is translucent when not active (i.e. when an image is not being displayed), and so the wearer 242 can perceive objects in the real world along a vector corresponding to display line 274.

FIG. 2B shows that touch pad 262 is parallel, or at least substantially parallel, to display line 274, and thus is perpendicular, or at least substantially perpendicular to display plane 276. As such, touch pad 262 is at least substantially perpendicular to an image displayed in display plane 276. In some scenarios, touch pad 262 can be perpendicular to display plane 276 and so be perpendicular to an image displayed by display 264 in display plane 276. In other scenarios, touch pad 262 can be substantially, but not exactly, perpendicular to display plane 276 depending on a shape of a face of wearer 242, an exact angle that wearer 242 wears HMD 260 at any specific time, a specific configuration of HMD 260, and for other reasons that would cause touch pad 262 to vary from being perpendicular to an image displayed by display 264 in display plane 276. In particular embodiments, touch pad 262 is substantially perpendicular to an image displayed by display 264 if a line from touch pad 262 to a plane of the image, e.g., display plane 276 is within 10 degrees of being perpendicular to the plane of the image.

III. EXAMPLE METHODS a. Size-Adjusting Operation

Figure 3:
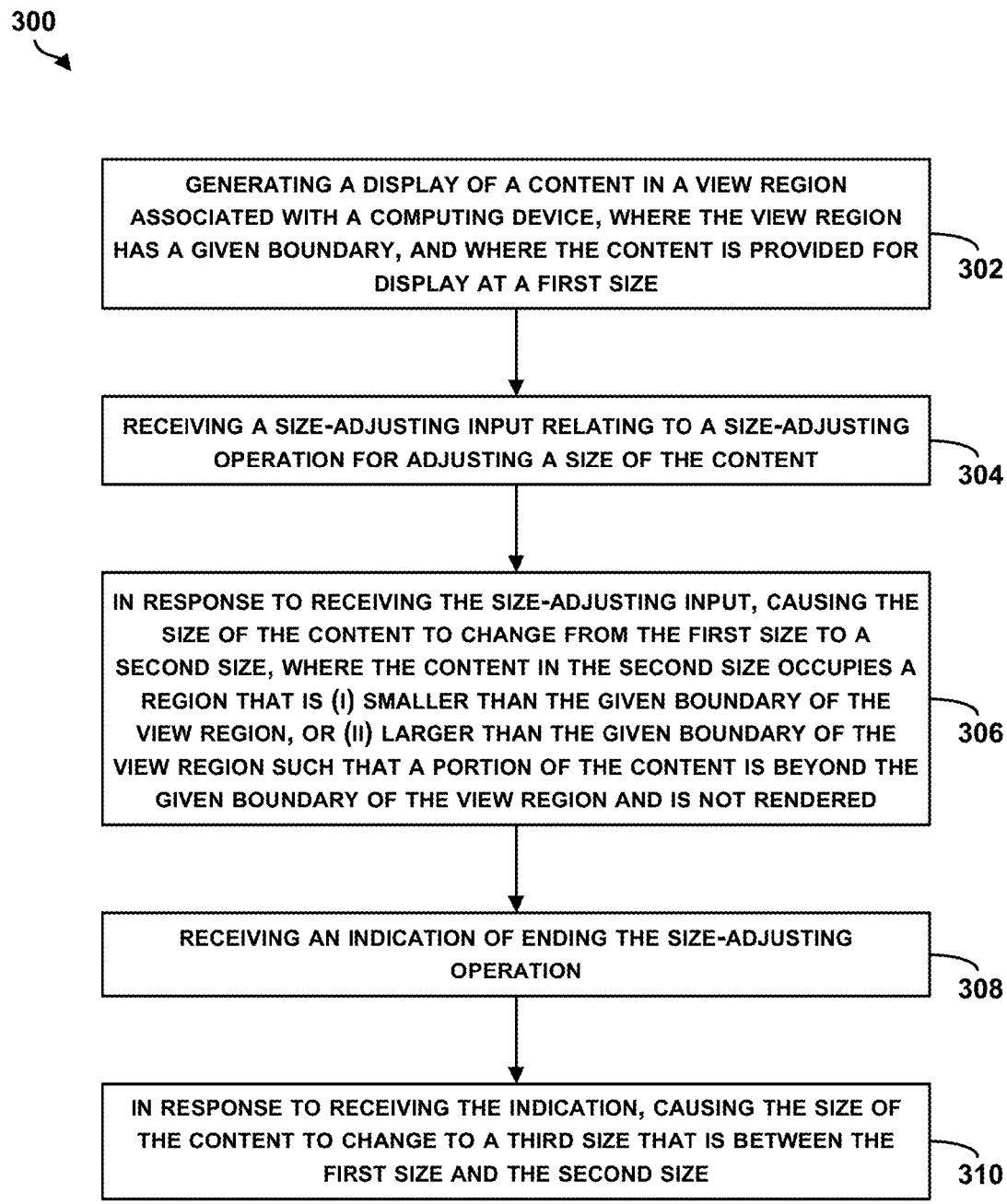
FIG. 3 is a flow chart of a method for changing a size of a content, in accordance with an example embodiment.

FIG. 3 is a flow chart of a method 300 for changing a size of a display of a content, in accordance with an example embodiment. The method 300 may include one or more operations, functions, or actions as illustrated by one or more of blocks 302-310. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the method 300 and other processes and methods disclosed herein, each block in FIG. 3 may represent circuitry that is wired to perform the specific logical functions in the process.

At block 302, the method 300 includes generating a display of a content in a view region associated with a computing device, where the view region has a given boundary, and where the content is provided for display at a first size. For example, the computing device may include the computing system 118 or 154 described above with respect to FIGS. 1A and 1C. In another example, the computing device may be part of or may include a wearable computing device similar to those described in FIGS. 1A-2B. In still other examples, the computing device may be an independent device in communication with the computing system 118 or 154, or the wearable computing devices describes in FIGS. 1A-2B. A display, such as the display 130, 134, 158 or 180, may be coupled to the computing device. The display may include a head-mounted display (HMD) as described above with respect to FIGS. 1A-2B.

The computing device may be configured to generate a display of a content on the display. As examples, the content may be a webpage, a graphical user interface associated with a given software application, or any other type of content. For instance, a wearer or a user may be looking at a given content that includes a hyperlink. The computing device may receive a request by the user indicating that the user selected the hyperlink so as to navigate the web to the webpage associated with the hyperlink. As an example, the computing device may generate a display of a reticle that can be moved by a user-input (e.g., finger or touch operation on a touch pad coupled to the computing device). The user may navigate the reticle to the location of the hyperlink and, for example, select the hyperlink by clicking or pressing on an input device to indicate selection of the hyperlink. The computing device may, accordingly, be configured to navigate the web and generate a display of the webpage associated with the hyperlink. The context of a hyperlink and a webpage is used herein as an example to illustrate the method 300. However, any other type of content can be used as well.

Figure 4:
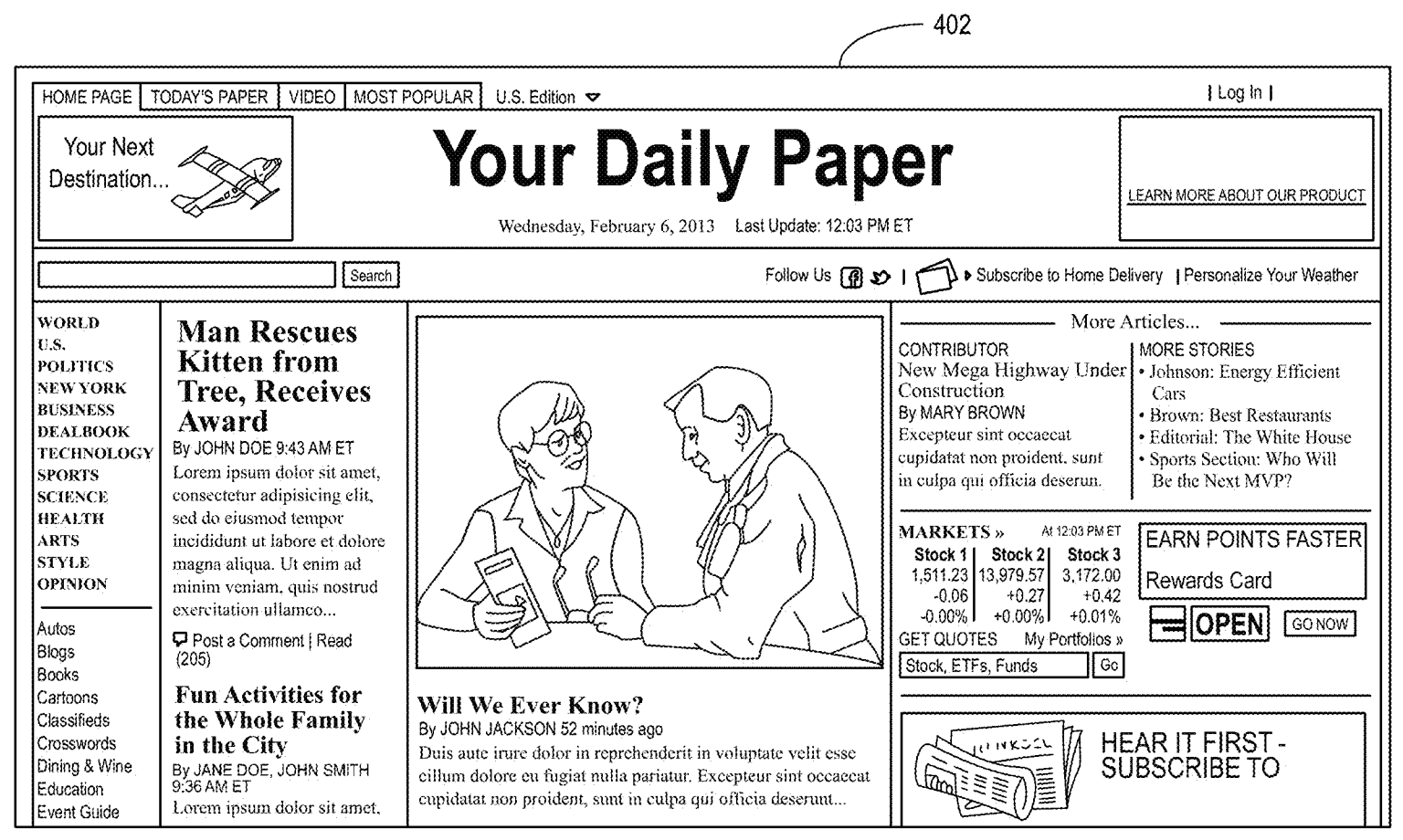

FIG. 4 illustrates a display of a content at a first size, in accordance with an example embodiment. The content depicted in FIG. 4 includes a webpage as an example for illustration. The computing device may generate the display of the content in a view region 402. A given boundary of the view region 402 may encompass a viewable area between upper, lower, left, and right boundaries of a display on an HMD, for example. While the view region 402 is shown to have a landscape shape (in which the view region 402 is wider than it is tall), in other examples the view region 402 may have a portrait or square shape, or may have a nonrectangular shape, such as a circular or elliptical shape. The view region 402 may have other shapes as well.

As shown in FIG. 4, the content or the webpage substantially occupies the view region 402. The word "substantially" is used herein to indicate that the size of the content is within a threshold size value from the size of the view region 402. For example, the content may be referred to as substantially occupying the view region 402 if the size of the content is greater than or equal to 98% of the size of the view region 402. In another example, instead of using a percentage of size, the size of the content may be defined in terms of an area occupied by the content relative to the area of the view region 402. These are examples for illustration only, and any other values or parameters can be used to define whether the content "substantially" occupies the view region 402.

At block 304, the method 300 includes receiving a size-adjusting input relating to a size-adjusting operation for adjusting a size of the content. The computing device may include, or may be coupled to, a finger-operable touch pad such as the touch pad 124 or 182 described above. The computing device may receive a size-adjusting input associated with movement by one or more fingers touching the touch pad, in the +Z or −Z direction. For example, a swipe toward a wearer of the HMD (sometimes termed swipe backward) can involve a swipe or movement by one or more fingers touching the touch pad toward the wearer. A swipe away (sometimes termed swipe forward) can involve a swipe movement by one or more fingers touching the touch pad away from the wearer. A touch pad is used herein as an example for illustration only. Any other input means can be used to indicate a size-adjusting input. For example, the computing device may be coupled to a button that can be used by a wearer as an input device to indicate a size-adjusting operation. In another example, the computing device may be configured to receive a voice from a user to indicate a size-adjusting operation.

At block 306, the method 300 includes, in response to receiving the size-adjusting input, causing the size of the content to change from the first size to a second size, where the content in the second size occupies a region that is (i) smaller than the given boundary of the view region, or (ii) larger than the given boundary of the view region such that a portion of the content is beyond the given boundary of the view region and is not rendered (i.e., not displayed).

Figure 5A:
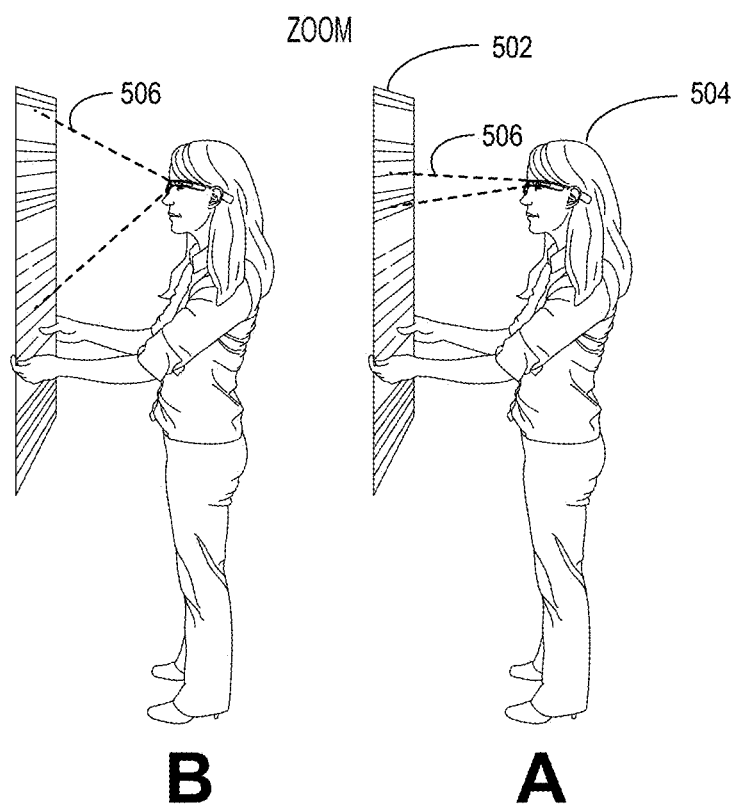
FIG. 5A illustrates zooming in on a content and zooming out of the content, in accordance with an example embodiment.

In one example, the size-adjusting operation may simulate zooming in or out of the content. FIG. 5A illustrates zooming in on a content and zooming out of the content, in accordance with an example embodiment. As shown in FIG. 5A, a user 504 may zoom in or out of the content 502 by changing a field of view (FOV) 506. For example, in configuration A, the user 504 has a narrow field of view 506 (compared to configuration B) that allows a higher level of details to be depicted within the FOV 506. The FOV 506 in this case represents a shrinked or diminished mask of the full FOV of the user 504. Despite the higher level of details, the narrow FOV 506 in this case may lead to uncomfortable or unstable panning (e.g., motion from left to right by the user's eyes to scan the content horizontally) as the zoom increases or the FOV 506 shrinks further.

In configuration B of FIG. 5A, the FOV 506 increases in size to simulate a zoom out operation. In configuration B, a larger amount of content can be encompassed by the FOV 506, but a lower level of details may be depicted with the FOV 506.

Figure 5B:
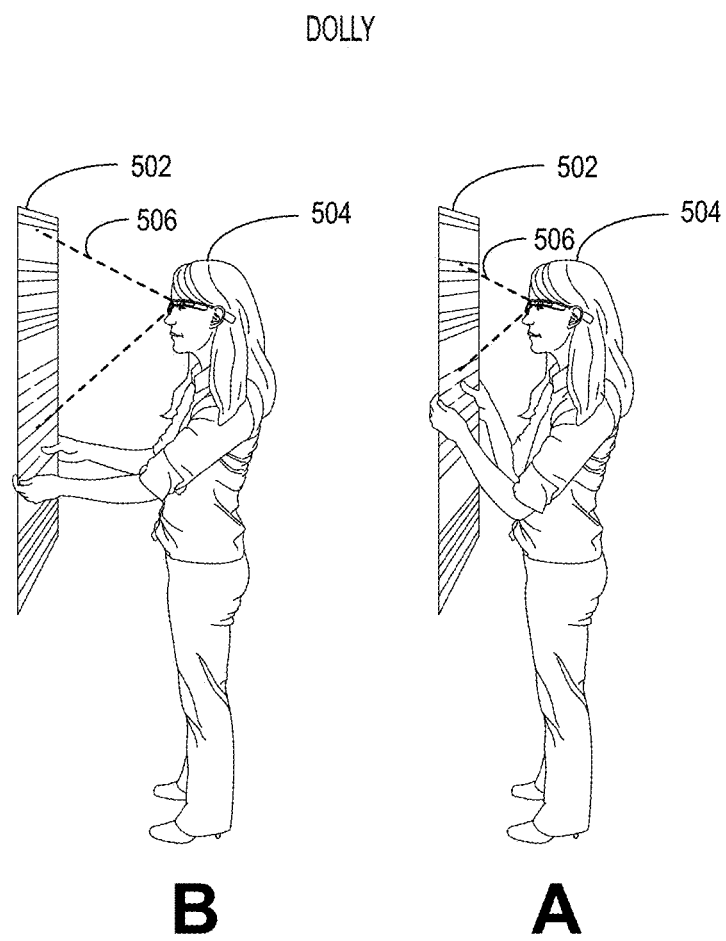
FIG. 5B illustrates moving the content closer to or away from a user, in accordance with an example embodiment.

In another example, the size-adjusting operation may simulate "dollying" or moving the content 502 closer to or away from the user 504. FIG. 5B illustrates moving the content 502 closer to or away from the user 504, in accordance with an example embodiment. In configuration A of FIG. 5B, the content 502 is closer to the user 504. In configuration B of FIG. 5B, the content 502 is further away from the user 504. "Dollying" or moving the content 502 closer to or away from the user 504 may achieve a balance between fidelity (i.e., a level of details seen by the user 504) and panning the content 502. The dollying approach simulates how a person may view a book or a newspaper (i.e., non-digital content). As the person holds the newspaper closer, the person can scan a few paragraphs of text at a higher level of detail. If the person holds the newspaper further away, the person can view a larger portion of the newspaper but at a lower level of detail. In FIGS. 5A and 5B, the content 502 is depicted as a newspaper as an example for illustration. However, zooming and dollying can also be simulated by the computing device regarding a digital content displayed on an HMD worn by the wearer/user 504.

The computing device may be configured to cause the size of the content to change from the first size to a second size so as to simulate either a zooming operation as described in FIG. 5A or a dollying operation as described in FIG. 5B. However, simulating the dollying operation may provide a balance between content detail and the field of view (FOV). In addition, simulating the dollying operation may provide a balance between sensitivity and fidelity when scanning or panning across the content. The second size may be smaller than the first size or vice versa based on the size-adjusting input.

FIGS. 6A-6H illustrate orthographic interpretation to prevent distortion of a display of a content, in accordance with an example embodiment. For example, the computing device may change a size of the content based on input from the user while the user is also panning (moving her head) left and right, up and down, or a combination thereof. FIG. 6A illustrates a wearer 600 looking to the left (from a perspective of the wearer 600) or moved her eyes to the left. As shown in FIG. 6, a gaze direction 602 is at an angle with respect to a plane 604 of display. The plane of display 604 is shown to be away from the wearer 600 for illustration. However, the plane of display 604 may be associated with an HMD (such as the HMDs illustrated in FIGS. 1A-1D) worn by the wearer 600, and the plane of display 604 may be the plane of the displays 130, 134, 158, or 180, for example. To prevent perspective distortion of the content, the computing device may be configured to orthographically interpret or resolve the gaze direction 602 of the wearer to a modified gaze direction 606 that is perpendicular to the plane 604 as shown in FIG. 6B.

FIG. 6C illustrates the wearer 600 looking to the left and bring the content on the plane of display 604 closer (e.g., by swiping a finger on the touch pad toward the wearer 600). To prevent perspective distortion of the content while bringing the content closer (or zooming in on the content), the computing device may be configured to orthographically interpret or resolve the gaze direction 602 of the wearer to the modified gaze direction 606 that is perpendicular to the plane 604 as shown in FIG. 6D.

FIGS. 6E-6F illustrate orthographic interpretation similar to FIGS. 6A-6B while the user is looking to the right (or moving her eyes to the right). Similarly, FIGS. 6G-6H illustrate orthographic interpretation similar to FIGS. 6C-6D while the user is looking to the right (or moving her eyes to the right).

Figure 6J:
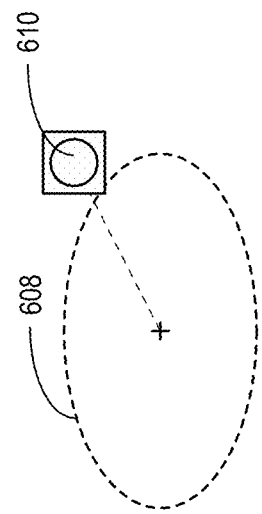
FIGS. 6I-6J illustrate accelerated scrolling, in accordance with an example embodiment.
Figure 6I:
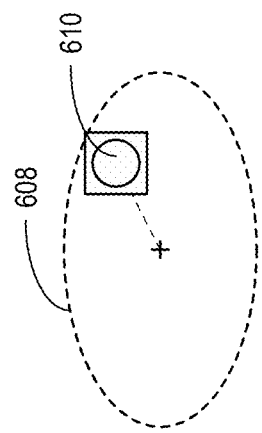

FIGS. 6I-6J illustrate accelerated scrolling, in accordance with an example embodiment. In examples, the computing device may be configured to define an elliptical boundary 608 within a view region (e.g., the view region 402) of the display. Thus, the boundary 608 may be defined within the plane 604. In examples, based on where a wearer is looking, the modified gaze direction 606 may fall within the boundary 608. FIG. 6I depicts a location of gaze 610 associated with the modified gaze direction 606 where the location 610 is within the boundary 608. In other examples, the modified gaze direction 606 may fall outside the boundary 608. FIG. 6J depicts the location of gaze 610 associated with the modified gaze direction 606 where the location 610 is outside the boundary 608. In the examples where the location 610 is outside the boundary 608, the computing device may scroll the content in a direction associated with the location 610 at a speed or acceleration that is based on a distance between the location 610 and the boundary 608 (e.g., how far the location 610 is from the boundary 608). An elliptical boundary is used herein as an example for illustration only. Any type of geometrical shape can be used as a boundary defined by the computing device.

Figure 7A:
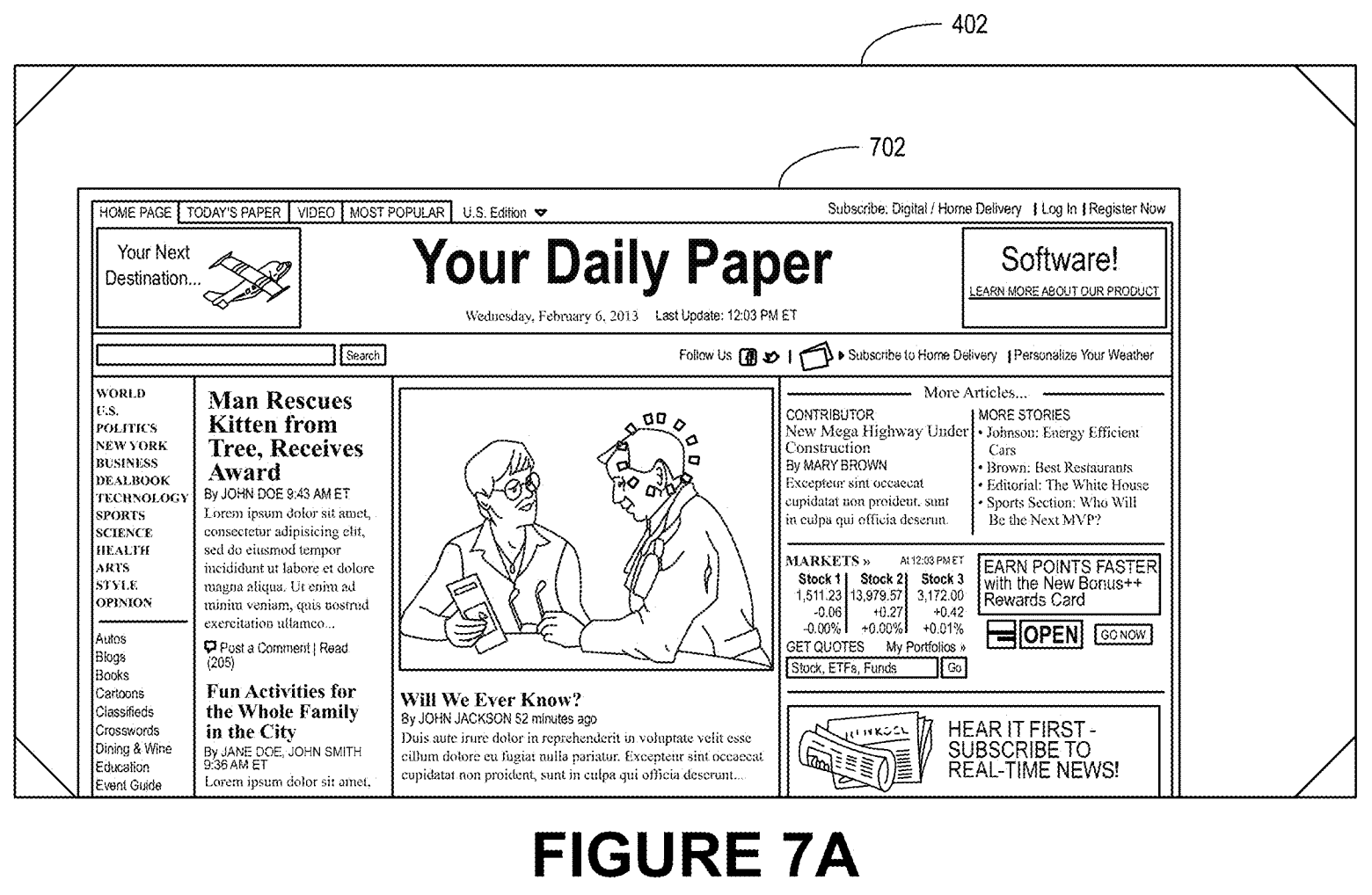

Assuming that the content at the first size substantially occupies the view region 402 of the display as shown in FIG. 4, and the second size is smaller than the first size, then the content at the second size occupies a region that is smaller than the given boundary of the view region 402. FIG. 7A illustrates the content in the second size occupying a region that is smaller than the given boundary of the view region 402, in accordance with an example embodiment. For instance, the computing device may receive the size-adjusting input represented by a swipe away (on the touch pad coupled to the computing device) from the wearer of the HMD. In response to the size-adjusting input, the computing device may be configured to adjust the size of the content (gradually) to the second size to simulate dollying or moving the content away from the wearer. As shown in FIG. 7A, the content, or the webpage in this example, occupies a region 702 that is smaller than the view region 402. The content appears smaller; however, the wearer can see a larger portion of the webpage compared to the portion depicted in FIG. 4.

Figure 7B:
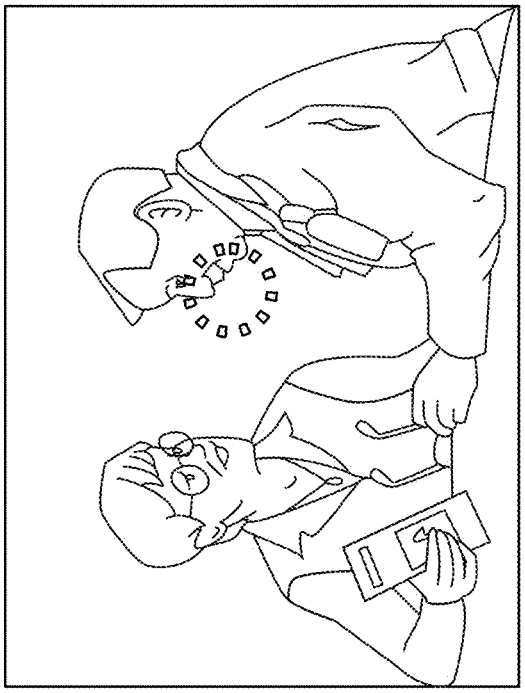
FIG. 7B illustrates the content in the second size occupying a region that is larger than the view region such that a portion of the content is beyond the given boundary of the view region and is not rendered, in accordance with an example embodiment.

FIG. 7B illustrates the content in the second size occupying a region that is larger than the view region 402 such that a portion of the content is beyond the given boundary of the view region 402 and is not displayed, in accordance with an example embodiment. For instance, the computing device may receive the size-adjusting input represented by a swipe toward the wearer of the HMD. The computing device may be configured to adjust the size of the content (gradually) to the second size to simulate dollying or moving the content closer to the wearer. As shown in FIG. 7B, the content (the webpage in this example) occupies a region that is larger than the view region 402. The content thus appears larger with a higher fidelity or level of details. However, the wearer can see a smaller portion of the webpage compared to the portion depicted in FIG. 4. The portions that are shown in FIG. 4, but are not shown in FIG. 7B are virtually beyond the given boundary of the view region 402 and are thus not depicted for the wearer to see.

Referring back to FIG. 3, at block 308, the method 300 includes receiving an indication of ending the size-adjusting operation. The computing device may receive an indication to end the size-adjusting operation. For example, if the size-adjusting input is associated with finger movement of the wearer of the HMD on the track pad, then the indication may include a release of the track pad such that the wearer is not touching the touch pad. In another example, the indication may include one or more taps on the touch pad. As an example, a tap operation can involve a single physical tap—that is, one quick, slight strike with one or more fingers on the touch pad. Releasing or tapping on the touch pad are example for illustration only. Any other means can be used to provide the indication of ending the size-adjusting operation. For instance, the indication may be voice-based, or may be related to head-motion, or any other input means.

At block 310, the method 300 includes, in response to receiving the indication, causing the size of the content to change to a third size that is between the first size and the second size. In response to receiving the indication of ending the size-adjusting operation, the computing device may be configured to cause the content to "bounce" so that a size of the content is adjusted to a third size. In an example, the third size may be the nearest size within a given boundary. In another example, the third size may be substantially equal to the first size or the second size. Thus, the size of the content may be affixed at the second size or may bounce back to the first size or any other size between the first size and the second size such that the third size is as close to the release size as allowed within a given boundary (i.e., boundary defined and described with respect to FIG. 8 below). Referring to FIG. 7A, the content occupying the region 702 may expand to substantially occupy the view region 402 again and the state of display reverts back to the state shown in FIG. 4. Similarly, referring to FIG. 7B, the content that is enlarged in FIG. 7B may shrink back to the size or state depicted in FIG. 4 as a result of the computing device receiving the indication of ending the size-adjusting operation. However, in other examples, the third size may be any size between the first size and the second size. In still other examples, the content may return to a nearest size within a given predetermined boundary as explain below in FIG. 8.

Figure 8:
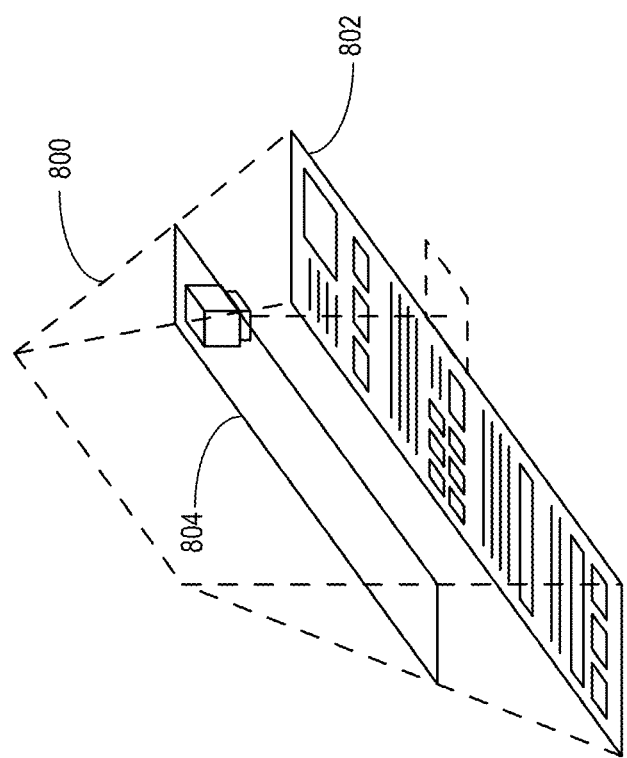
FIG. 8 illustrates conforming a boundary of the content to a cross section of a prism, in accordance with example embodiment.

In examples, a boundary of the content having the first size, a boundary of the content having the second size, and a boundary of the content having the first size form parallel cross sections of a prism. FIG. 8 illustrates conforming a boundary of the content to a cross section of a prism 800, in accordance with example embodiment. The prism 800 indicates X, Y, and Z limits during navigation of the content. FIG. 8 depicts a display of a content having a first size represented by cross section 802. As a result of size-adjusting operation as described above, a size of the content may change to a second size having a cross section 804 (smaller than the first size having the cross section 802). As a result of receiving an indication of ending the size-adjusting operation, the computing device may cause the size of the content to change to a third size (not shown) between the first size represented by cross section 802 and the second size represented by the cross section 804 (e.g., that is the nearest size within the boundary of the prism). The third size may be represented by a rectangular cross section (not shown) bound by the prism 800 between the cross sections 802 representing the content at the first size and the cross section 804 representing the content at the second size. Conforming the boundary or cross section of the content to a prism is an example for illustration only. Other configurations can be used.

In examples, to enhance user experience of changing the size and bouncing the content from the second size to third size, the function of bouncing the content may simulate a virtual spring exerting a force on the content. The computing device may simulate the virtual spring acting on the content to change the size of the content from the second size to the third size at a speed that is based on the size-adjusting input. For example, the speed at which the content bounces back may be based on a magnitude of the size-adjusting input. For instance, the size-adjusting input may indicate changing the size of the content to a smaller size (e.g., a swipe on the touch pad away from the wearer of an HMD). The smaller the size (e.g., the larger the magnitude of the swipe away from the wearer), the faster the computing device may bounce the content back to the third size. Similarly, the size-adjusting input may indicate changing the size of the content to a larger size (e.g., a swipe on the touch pad toward the wearer of an HMD). The larger the size (e.g., the larger the magnitude of the swipe towards the wearer), the faster the computing device may bounce the content back to the third size.

b. Position-Adjusting Operation

Figure 9:
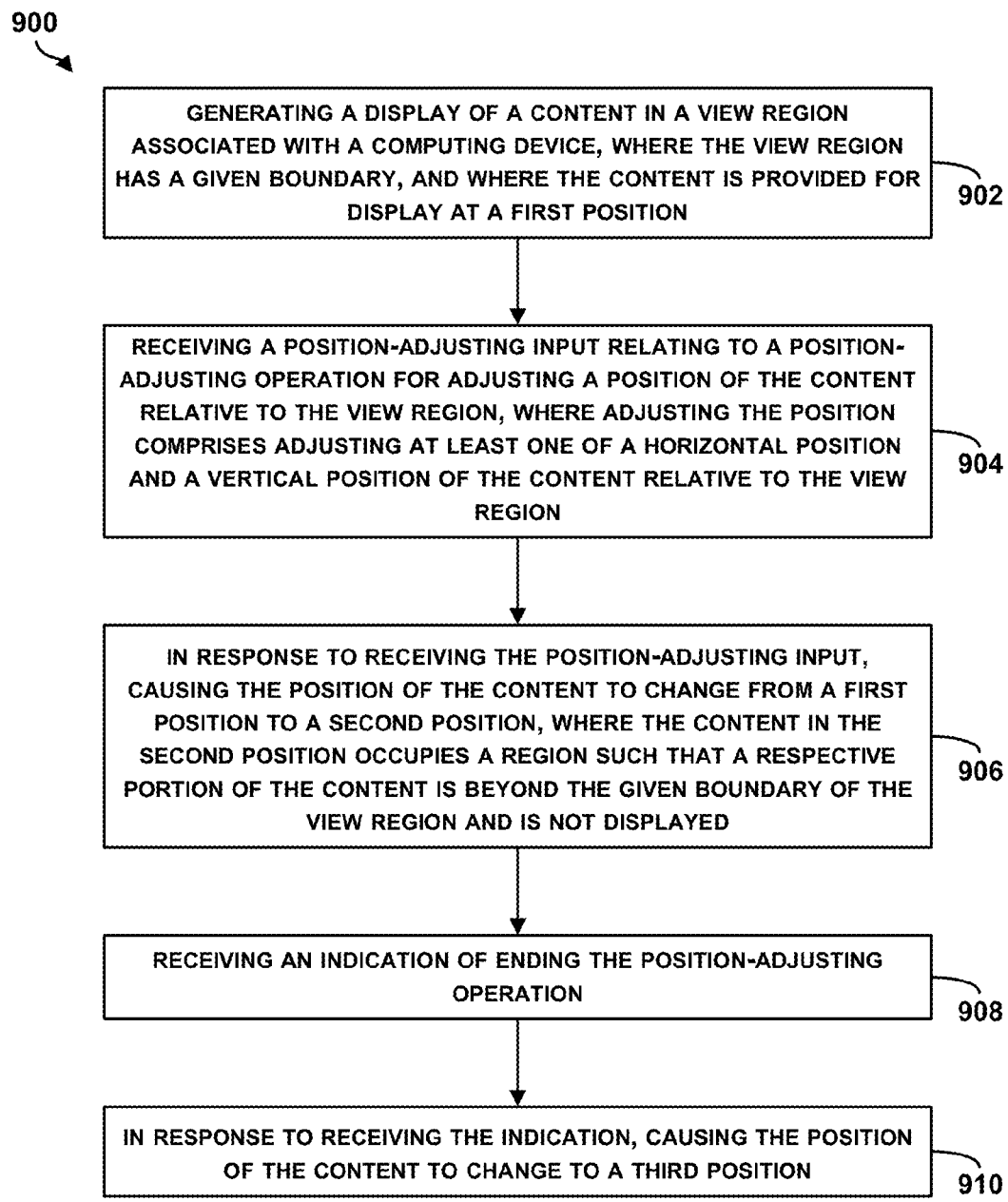
FIG. 9 is a flow chart of a method for changing a position of a display of a content, in accordance with an example embodiment.

FIG. 9 is a flow chart of a method 900 for changing a position of a display of a content, in accordance with an example embodiment. The method 900 may include one or more operations, functions, or actions as illustrated by one or more of blocks 902-910. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 902, the method 900 includes generating a display of a content in a view region associated with the computing device, where the view region has a given boundary, and where the content is provided for display at a first position. For example, the computing device may include the computing system 118 or 154 described above with respect to FIGS. 1A and 1C. In another example, the computing device may be part of or may include a wearable computing device similar to those described in FIGS. 1A-2B. In still other examples, the computing device may be an independent device in communication with the computing system 118 or 154, or the wearable computing devices describes in FIGS. 1A-2B. A display, such as the display 130, 134, 158 or 180, may be coupled to the computing device. The display may include a head-mounted display (HMD) as described above with respect to FIGS. 1A-2B. FIG. 4 discussed above illustrates a display of a content—a webpage—at a first position within the view region 402 where a given portion of the content substantially occupies the view region 402.

At block 904, the method 900 includes receiving a position-adjusting input relating to a position-adjusting operation for adjusting a position of the content relative to the view region, where adjusting the position comprises adjusting at least one of a horizontal position and a vertical position of the content relative to the view region. The position-adjusting input may take several forms. For example, the position-adjusting input may include (or may be derived from) data received from one or more movement sensors, accelerometers, gyroscopes, and/or detectors configured to detect one or more head movements. The one or more movement sensors may be included in the wearable computing device or may be included in a peripheral device communicatively coupled to the wearable computing device. In another example, the position-adjusting input may be related to an eye-tracking system where eye-motion may indicate panning across or throughout the content. In still another example, the computing device may be configured to receive a voice from a user to indicate a position-adjusting operation. As yet another example, the position-adjusting input may include (or may be derived from) data received from a touch pad, such as the finger-operable touch pad 124 described above in connection with FIG. 1A (in this case the size-adjusting input may be received through other means). Other input device included in or coupled to the wearable computing device and configured to detect one or more movements may be used. In some examples, the position-adjusting input may comprise an indication corresponding to the head-motion as well as an extent of the motion, such as a magnitude, speed, and/or acceleration of the motion.

Thus, the computing device may be configured to receive from a given sensor information indicative of the position-adjusting input. For instance, as the wearer moves his head left and right (i.e., in the −X or +X direction), the computing device may receive the position-adjusting input indicating the wearer is panning across the content. In this case, the position-adjusting input may indicate a request to change a horizontal position of the content with respect to the view region, for example. Similarly, in addition to or alternative to receiving information indicative of head-motion left and right, the computing device may receive the position-adjusting input related to head-motion up and down (i.e., in the +Y or −Y direction) the wearer is panning the content up and down. In this case, the position-adjusting input may indicate a request to adjust a vertical position of the content with respect to the view region.

At block 906, the method 900 includes, in response to receiving the position-adjusting input, causing the position of the content to change from a first position to a second position, where the content in the second position occupies a region such that a respective portion of the content is beyond the given boundary of the view region and is not rendered (i.e., not displayed).

Figure 10:
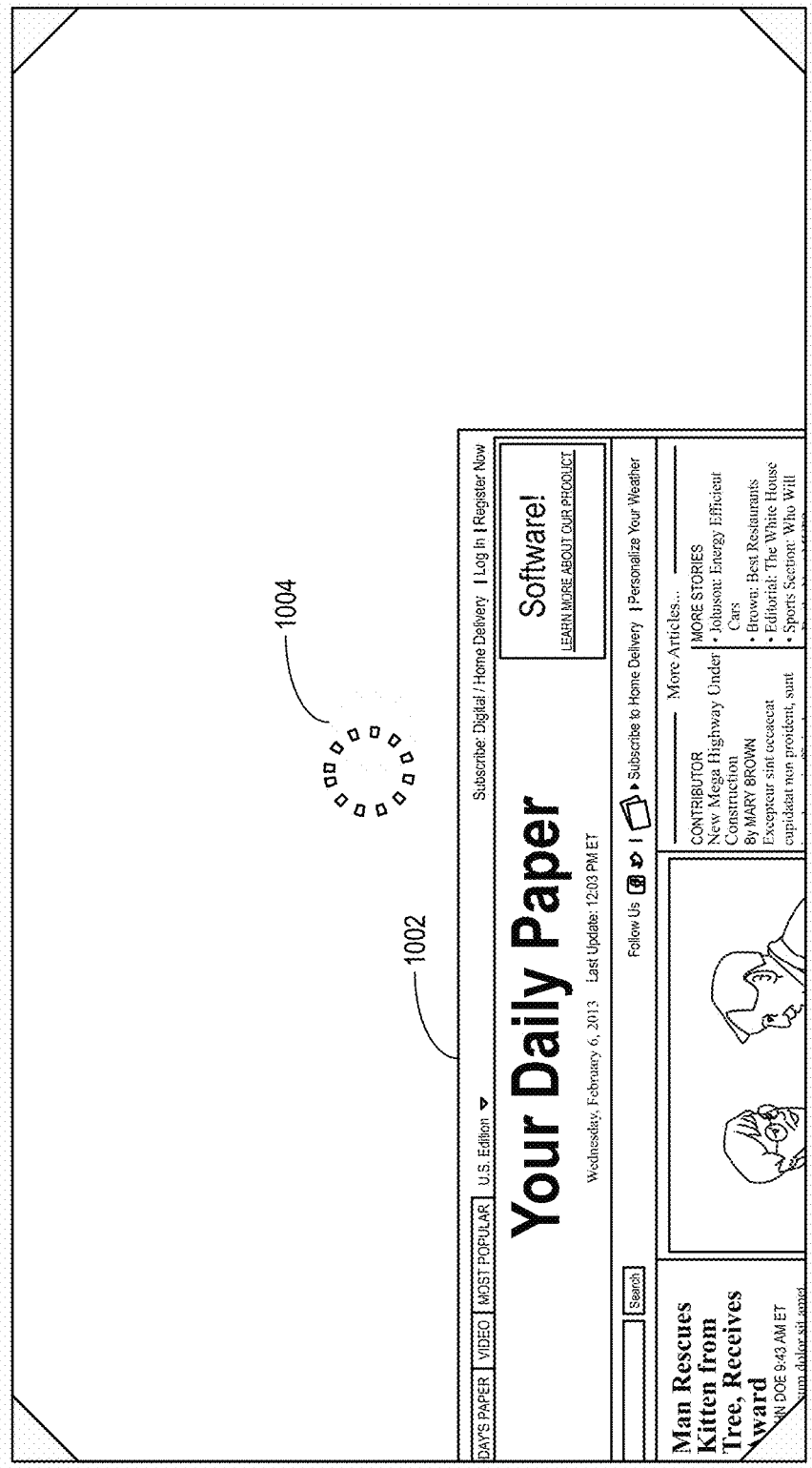
FIG. 10 illustrates changing a position of the content to a second position, in accordance with an example embodiment.

FIG. 10 illustrates changing a position of the content to a second position 1002, in accordance with an example embodiment. FIG. 10 depicts that the content moved to the left and down to the second position 1002 such that a portion of the content that is depicted in FIG. 4 is not displayed in FIG. 10. For instance, the computing device may receive the position-adjusting input represented by head-motion to the left and down to navigate or explore given portions of the content. In some examples (when the content is larger than the view region 402 for instance), a change in position of the content may cause a portion of the content that was visible in the first position to be not visible (i.e., not displayed) in the second position, but may cause other portions that were not visible (i.e., not displayed) in the first position to be visible in the second position. Thus, in response to the position-adjusting input, the computing device may be configured to change the position the content (gradually) to the second position 1002 that may be different from the first position in terms of horizontal and vertical position or coordinates.

Referring back to FIG. 9, at block 908, the method 900 includes receiving an indication of ending the position-adjusting operation. The computing device may receive an indication to end the position-adjusting operation. For example, if the position-adjusting input is associated with head movement, then the indication may include any type of predetermined head gestures to indicate ending the position-adjusting operation. In some examples, the computing device may be configured to operate in a position-adjusting mode for the content when the wearer performs a gesture at the touch pad (e.g., tap or touch and continue to touch the touch pad). In these examples, the indication of ending the position-adjusting operation may be related to an input received at the touch pad. For instance, the indication may include one or more taps on the touch pad to indicate releasing or ending the position-adjusting operation. Any other means can be used to provide the indication of ending the position-adjusting operation. For instance, the indication may be voice-based or may comprise.

At block 910, the method 900 includes, in response to receiving the indication, causing the position of the content to change to a third position. In response to receiving the indication of ending the position-adjusting operation, the computing device may be configured to cause the content to "bounce" so that a position of the content is adjusted to a third position. In one example, the third position may be substantially equal to the first position. Thus, the position of the content may be affixed at the second position or may bounce back to the first position or any other position with a given boundary. The word "substantially" is used herein to indicate that the third position is within a threshold value (e.g., X coordinate value and/or Y coordinate value) from a given position. In this example, referring to FIG. 10, the content in the third position 1002 may "bounce" back to the first position depicted in FIG. 4. Thus, the horizontal position and the vertical position of the content are changed back to the respective horizontal position and vertical position of the content as depicted in FIG. 4. However, in examples, the third position 1002 may be any position between the first position and the second position. In other examples, the third position 1002 may be the nearest position within a given boundary (e.g., the boundary of a prism).

In examples, to enhance user experience of changing the position and bouncing the content from the second position to third position, the function of bouncing the content may simulate a spring exerting a force on the content to change the position of the content from the second position to the third position at a speed that is based on the position-adjusting input. For example, the speed at which the content bounces back may be based on a magnitude of the position-adjusting input. FIG. 10 depicts a reticle 1004 at the center of the view region 402. The speed at which the content bounces back may be based, for example, on a distance between the reticle or a center of the view region 402 and a given edge (e.g., top edge) of the content at the position 1002. As an example, the larger the distance between the reticle or the center of the view region 402 and the given edge, the faster the computing device may cause the content to bounce back to the third position.

c. Combined Size-Adjusting and Position-Adjusting Operations

In examples, the computing device may be configured to perform a combined size-adjusting and position-adjusting operation. For instance, the combined operation may be triggered when the wearer of the HMD taps on a touch pad, begins to move her head, and swipe her finger on the touch pad. In response to head movement, the computing device may be configured to cause a change in a position of the content (panning). In response to the finger swipes on the touch pad, the computing device may be configured to cause a change in a size of the content. The combined inputs may simulate three-dimensional motion or navigation of the content, where the content can be brought closer or further while the content is moving rightward, leftward, downward, or upward or a combination thereof relative to the view region.

Figure 11:
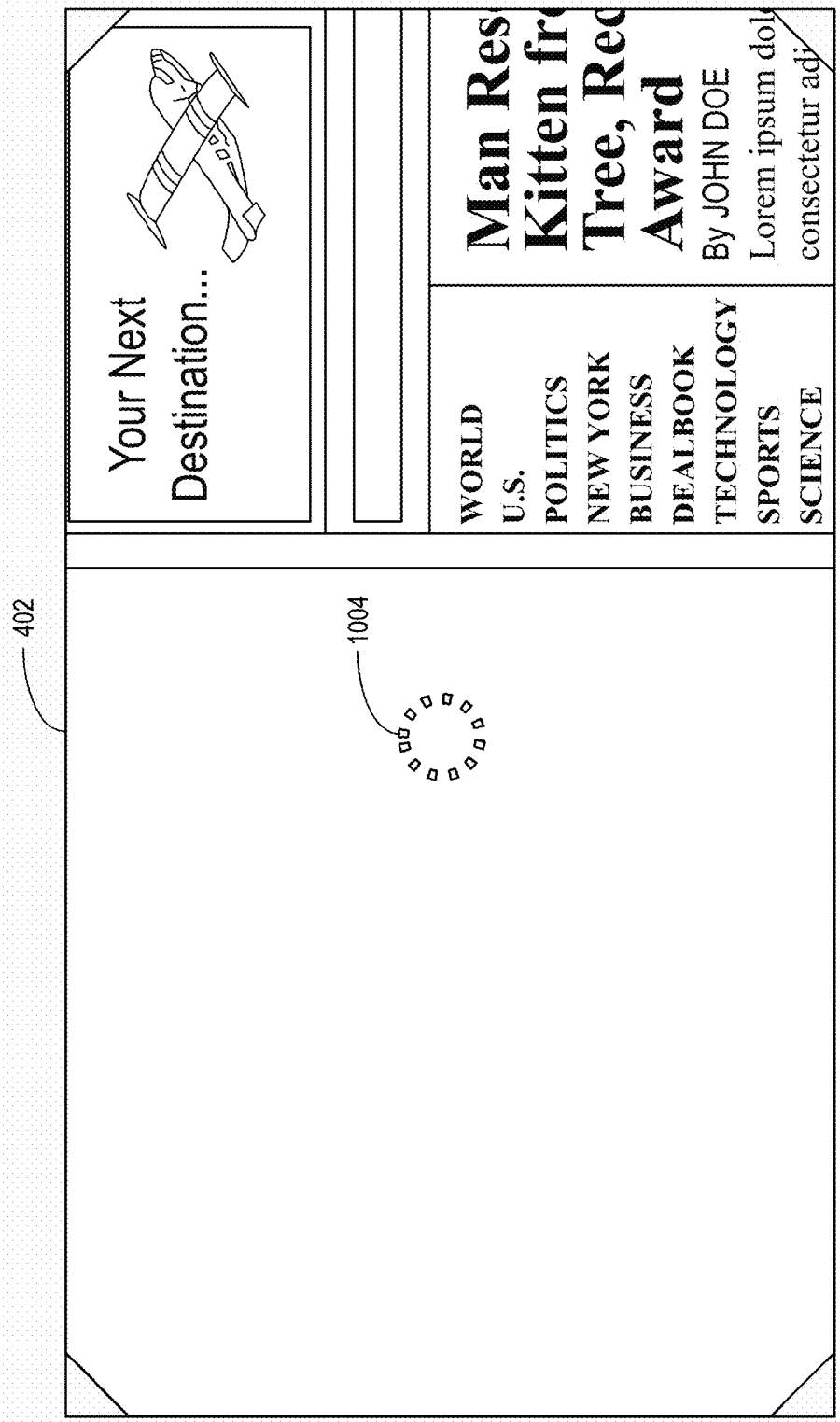
FIG. 11 illustrates a change in size and a change in position of a content, in accordance with an example embodiment.

FIG. 11 illustrates a change in size and a change in position of a display of a content, in accordance with an example embodiment. The computing device may generate a display of the webpage shown in FIG. 4, then receive an input (e.g., a tap on the touch pad) to indicate a request by the wearer or user to start size-adjusting and/or position-adjusting operation. For example, the computing device may receive a head-movement input indicating panning to the right and, in response, adjust the position of the content as shown in FIG. 11. Simultaneously, or substantially simultaneously, the computing device may receive a size-adjusting input indicated by finger motion on the touch pad. In response, the computing device may change the size of the content. FIG. 11 depicts an increase in the size of the content indicating that the computing device may have received a zoom-in request (or a request to simulate bringing the content closer to the wearer).

Figure 12:
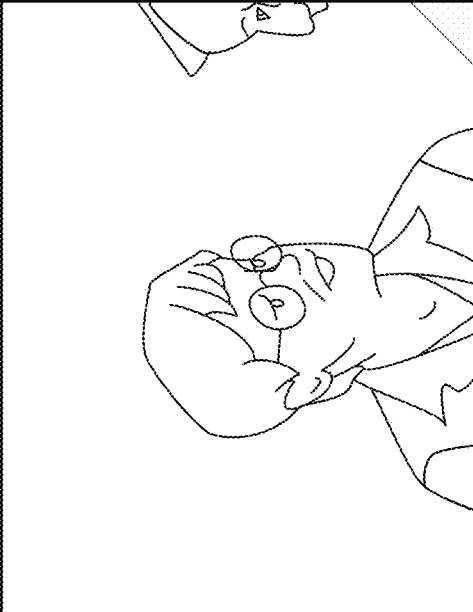
FIG. 12 corresponds to FIG. 11 when an input is released, in accordance with an example embodiment.

In examples, the computing device, in response to receiving an indication of a release of one or both inputs, may cause the content to bounce back to a different position and/or size. FIG. 12 corresponds to FIG. 11 when an input is released, in accordance with an example embodiment. FIG. 12 may depict a response by the computing device to a release of the touch pad, for example. The computing device caused the content depicted in FIG. 11 to bounce back to another position such that a given portion of webpage substantially occupies the view region 402. It should be noted that as depicted in FIG. 12, the size of the content did not change upon releasing the track pad. However, in other examples, the computing device may cause the size of the content to change as well.

Figure 13:
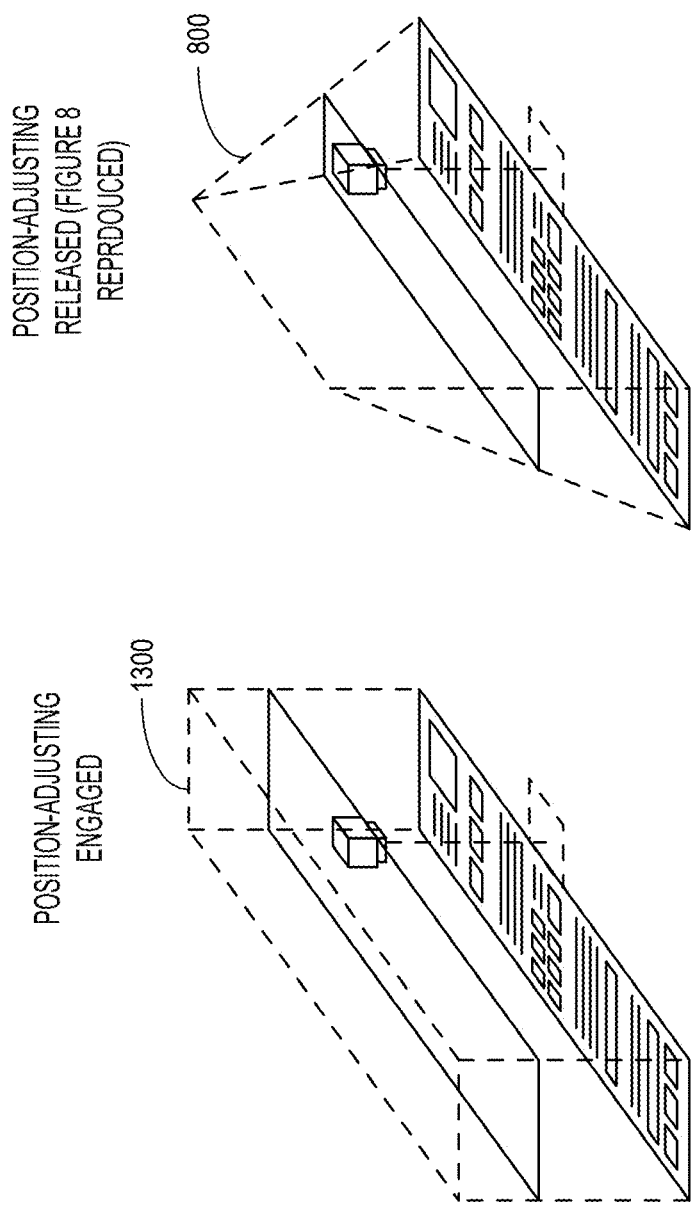
FIG. 13 illustrates conforming a boundary of the content to a cross section of a rectangular prism, in accordance with an example embodiment.

FIG. 8 described above illustrates conforming a boundary of the content to a cross section of a prism 800 when the computing device is engaged in a size-adjusting operation. FIG. 13 illustrates conforming a boundary of the content to a cross section of a rectangular prism 1300, in accordance with an example embodiment. FIG. 8 is reproduced in FIG. 13 for convenience). In some examples, when the computing device is engaged in a combined size-adjusting and position-adjusting cooperation, the computing device may be configured to cause the boundary of the content to conform to the rectangular prism 1300 instead of the prism 800. The rectangular prism 1300 indicates X, Y, and Z limits when the computing device is engaged in a combined size-adjusting and position-adjusting navigation of the content. Thus, in examples, when the position-adjusting operation is active in addition to the size-adjusting operation, the computing device may be configured to cause the position of the content to change and bounce back to a given position without changing a size of the content as shown by the rectangular prism 1300. When position-adjusting in not active or not engaged, the computing device may cause the content to be bound by the prism 800.

IV. EXAMPLE USER-INTERFACE FEATURES

The following description and Figures illustrate example features that enhance user-interaction with the size-adjusting operation, position-adjusting operation, and the displayed content in general.

Figure 14A:
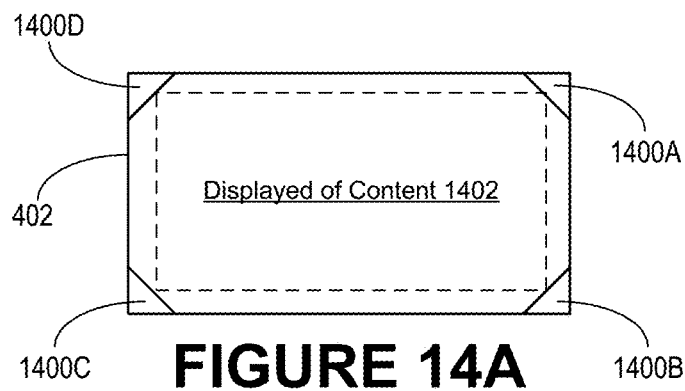
FIGS. 14A-14C illustrate animating a visual element to indicate a size-adjusting state, in accordance with an example embodiment.
Figure 14B:
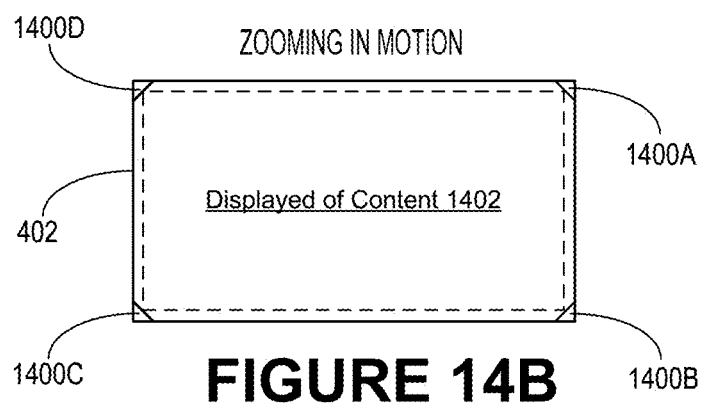
Figure 14C:
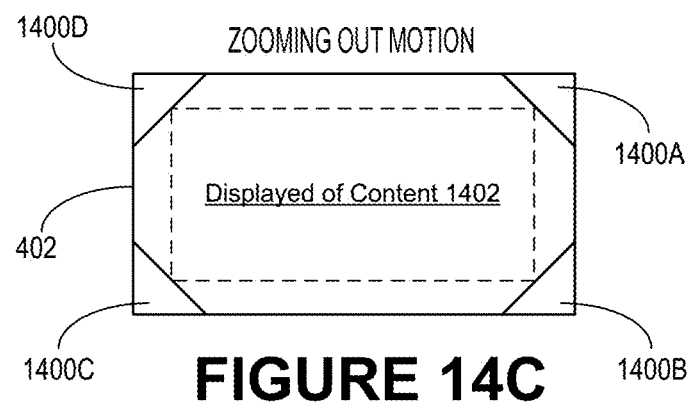

FIGS. 14A-14C illustrate animating a visual element to indicate size-adjusting state, in accordance with an example embodiment. FIG. 14A depicts the view region 402 visual elements comprising triangular corners 1400A, 1400B, 1400C, and 1400D. The triangular corners 1400A, 1400B, 1400C, and 1400D may animate into view when a given content 1402 is initially displayed in the view region 402. In an example, the triangular corners 1400A, 1400B, 1400C, and 1400D may animate out of view (e.g., disappear) if a predetermined period of time passes without activity by the wearer/user. The computing device may receive an indication of the wearer/user engaging (e.g., touching) the touch pad, and cause the triangular corners 1400A, 1400B, 1400C, and 1400D to animate back into view. The computing device may receive a size-adjusting input at the touch pad (e.g., indicated by the wearer swiping one or more fingers on the touch pad toward or away from the wearer). The computing device may cause the triangular corners 1400A, 1400B, 1400C, and 1400D to change size to indicate the direction of size-adjustment. For example, FIG. 14B illustrates the triangular corners 1400A, 1400B, 1400C, and 1400D shrinking in size while the computing device is causing a size of the content 1402 to increase (e.g., zoom in). FIG. 14C illustrates the triangular corners 1400A-1400D increasing in size to indicate a decrease in size (e.g., zoom out) of the content 1402, for example. In this manner, the computing device provides a visual indication that the size of the content is changing and whether the size is increasing or decreasing.

Figure 14D:
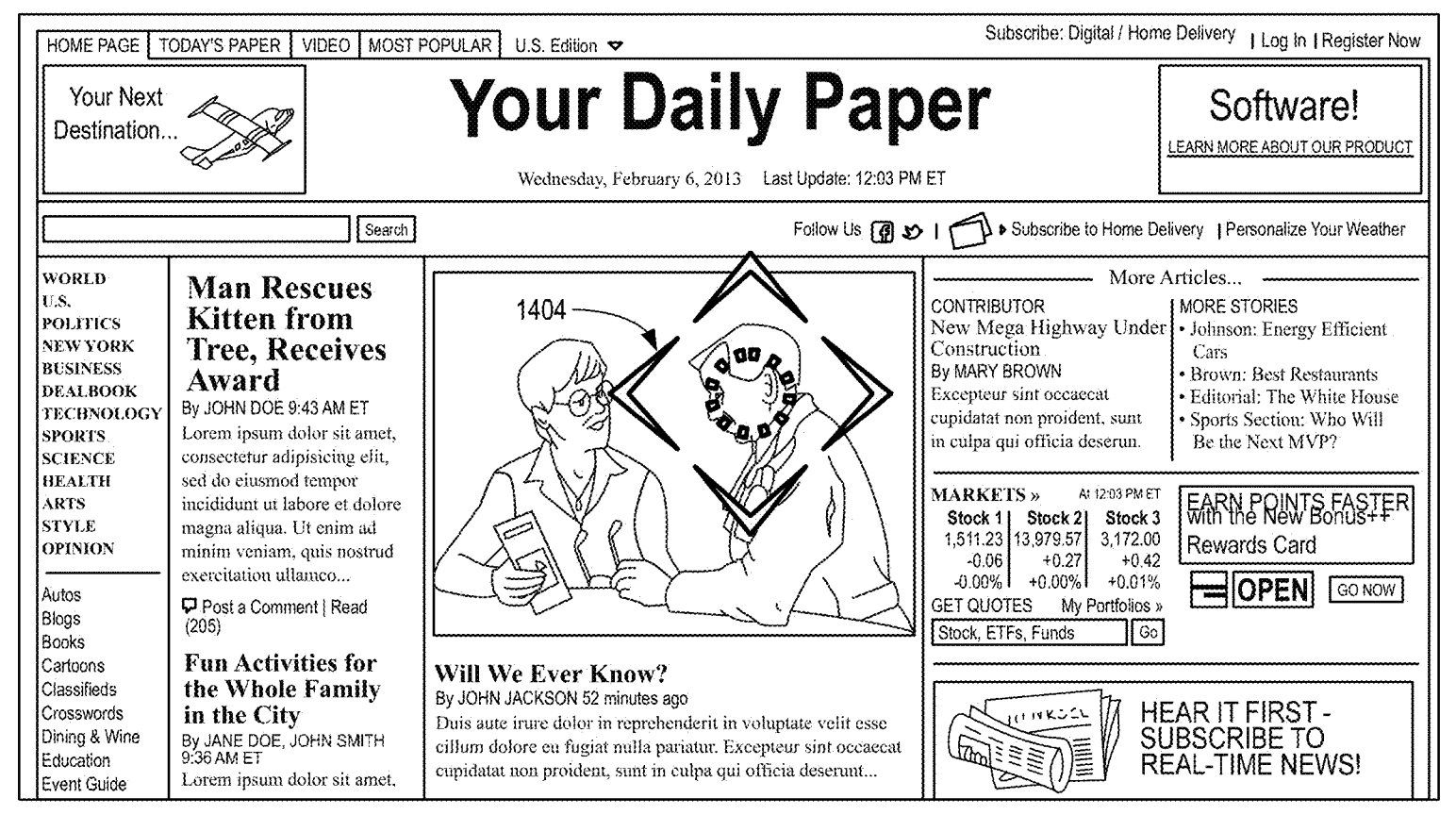
Figure 14E:
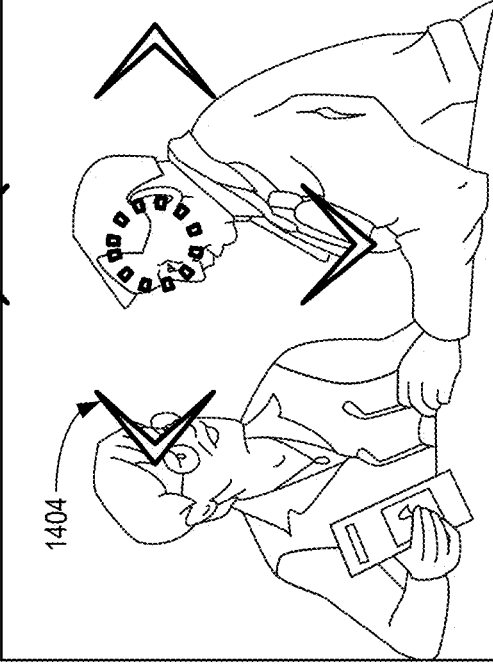

Triangular corners are used herein as an example for illustration only. Any type of geometric shapes (e.g., a circle, rectangle, square, etc.) can be used. As an example, the indicators of size changing may be built into the reticle, i.e., a shape and a size of the reticle may change to indicate whether the size of the content is changing. FIGS. 14D-14E illustrate animating a reticle to indicate size-adjusting state, in accordance with an example embodiment. In FIG. 14D, a reticle 1404 is depicted having at a given shape (a circle in the middle and four arrows around the circle) and size. The computing device may receive a size-adjusting input to zoom in (or bring the content closer to the wearer) as shown in FIG. 14E. The computing device may also cause the reticle 1404 to change size to indicate the direction of size-adjustment. For example, as shown in FIG. 14E, the reticle 1404 increases in size to indicate the direction of zoom (or that the content is brought closer to the wearer and thus appear larger). Similarly, if the content decreased in size, the reticle 1404 may decrease in size to indicate that the content decreased in size. In this manner, the computing device provides a visual indication using the size and/or shape of the reticle 1404 that the size of the content is changing and whether the size is increasing or decreasing.

Figure 15I:
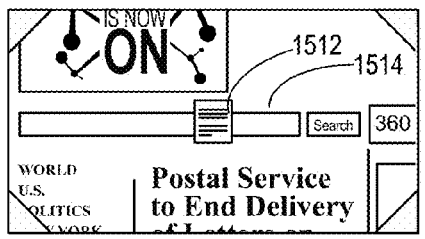
FIGS. 15A-15P illustrate contextual reticle and menu items, in accordance with example embodiments.
Figure 15J:
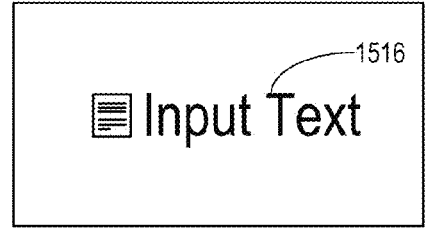
Figure 15K:
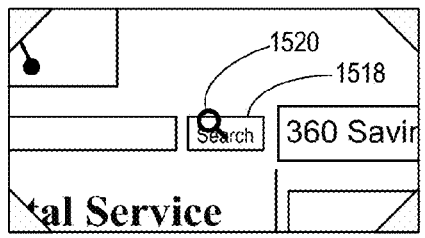
Figure 15L:
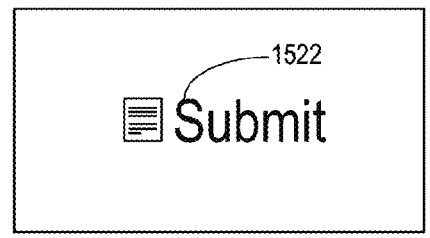
Figure 15M:
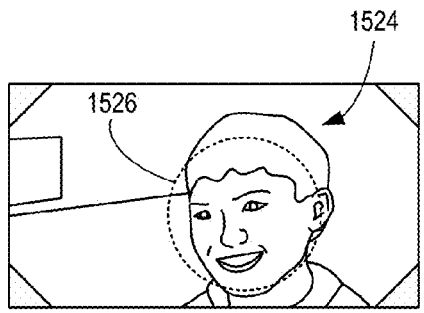
Figure 15N:
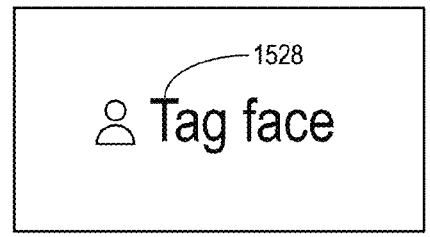
Figure 15O:
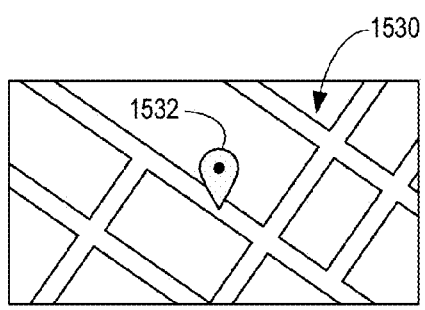
Figure 15P:
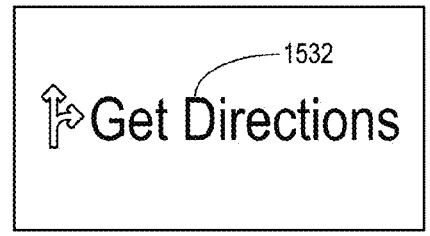

FIGS. 15A-15P illustrate contextual reticle and menu items, in accordance with example embodiments. The computing device may be configured to generate a display of a reticle in the view region to facilitate navigation of the displayed content. FIG. 15A illustrates an example default reticle 1004. As a wearer or user of a wearable computing device or HMD navigate a display of a content with a view region (e.g., by moving a finger on a touch pad coupled to the computing device or HMD), the reticle 1004 may be configured to hover over a particular type of content. The computing device may be configured to change a shape of the reticle 1004 based on the type of content the reticle 1004 hovers over. For example, if the reticle 1004 hovers over a hyperlink, the computing device may change a shape of the reticle 1004 as shown in FIG. 15B to a hyperlink cursor hand 1502.

FIG. 15C illustrates a display of a content in a view region where, in response to a size-adjusting operation or a position-adjusting operation, the computing device may have increase a size of a portion of the content or change a position of the content. Upon receiving an indication of ending the size-adjusting operation (e.g., releasing a touch pad) or the position-adjusting operation (e.g., stopping head movement), the computing device may be configured to realign a portion of the content (or slightly adjust a size and/or position of the content) such that a whole or meaningful element or portion of the content appears within the view region as shown in FIG. 15D, for example. FIG. 15C depicts a change in a shape of the reticle to a "read aloud" reticle 1504. FIG. 15E illustrates a portion of the content after slight adjustment of size and/or position and the "read aloud" reticle 1504. The computing device may further receive an input at the touch pad (or any other input device) such as a tap by the wearer or user, and may accordingly generate a display of a menu having at least one menu item. FIG. 15F illustrates a display of a "read aloud" menu item 1506 corresponding to the "read aloud" reticle 1504. If the wearer taps one more time, for example, to indicate selection of the menu item, the computing device may generate voice output associated with reading the text aloud. Thus, the computing device may be configured to generate a display of a menu and menu items that are specific to a type of content that the reticle hovers over.

As another example, FIG. 15G illustrates a hyperlink 1508 and the shape of the reticle changed to the hyper link cursor 1502. The computing device may receive an input at the touch pad such as a tap, for example, and may accordingly generate a display of at least one menu time corresponding to the hyperlink. FIG. 15H illustrates that a "Select Link" menu item 1510, for example, that corresponds to the hyperlink 1508 and the hyperlink hand cursor 1502.

As still another example, FIG. 15I illustrate the reticle hovering over an input box 1512 of a search engine or any other form input. The computing device may thus change a shape of the reticle to the icon 1514 indicating a text input field. In some examples, the computing device may further highlight or emphasize the box 1512 to indicate that a text input is expected. As the computing device receives an input from the wearer (e.g., a tap), the computing device may generate a display of an "input text" menu item 1516 that is appropriate for the box 1512 and the icon 1514 as shown in FIG. 15J.

As yet another example, FIG. 15K illustrates the reticle hovering over a selectable button 1518 labelled "search." The computing device may be configured to change the shape of the reticle to a magnifying glass icon 1520. Upon receiving an input from the user (e.g., a tap on the touch pad), the computing device may generate a display of a "submit" menu item 1522 as shown in FIG. 15L.

As yet still another example, FIG. 15M illustrates an image 1524. The computing device may be configured to change the shape of the reticle to a dotted circle 1526 around a face in the image, for example. Upon receiving an input from the user (e.g., a tap on the touch pad), the computing device may generate a display of a "Tag face" menu item 1528 as shown in FIG. 15N. FIGS. 15A-15N illustrate examples for illustration only. The computing device may be configured to generate any type of reticles and menu items based on context and type of the content.

As yet another example, FIG. 15O illustrates a map 1530. The computing device may be configured to change the shape of the reticle to a map pin icon 1532, for example. Upon receiving an input from the user (e.g., a tap on the touch pad), the computing device may generate a display of a "Get Directions" menu item 1534 as shown in FIG. 15P. FIGS. 15A-15N illustrate examples for illustration only. The computing device may be configured to generate any type of reticles and menu items based on context and type of the content.

Figure 16A:
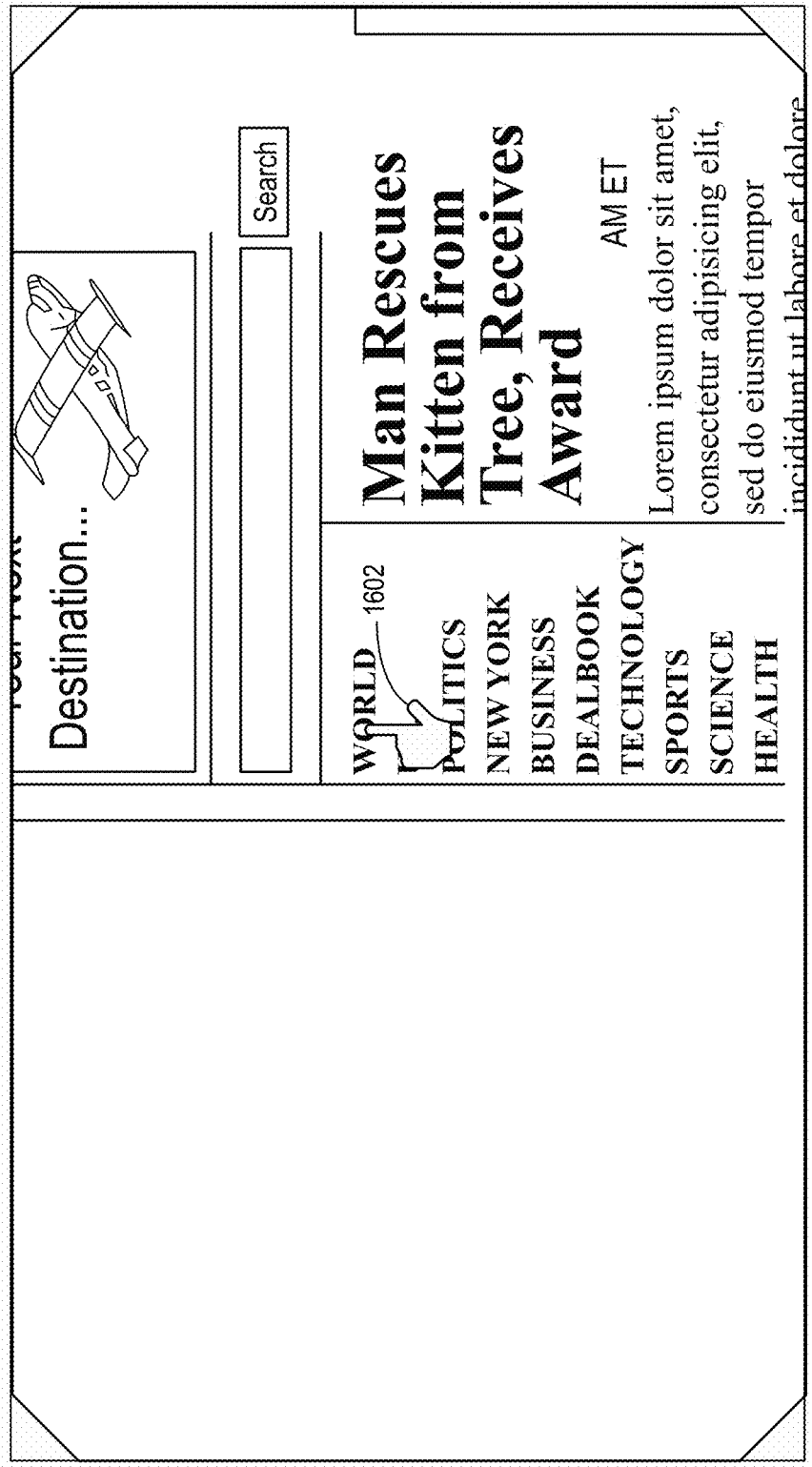
FIGS. 16A-16B illustrate pinning a reticle to a portion of a content during a position-adjusting operation, in accordance with an example embodiment.
Figure 16B:
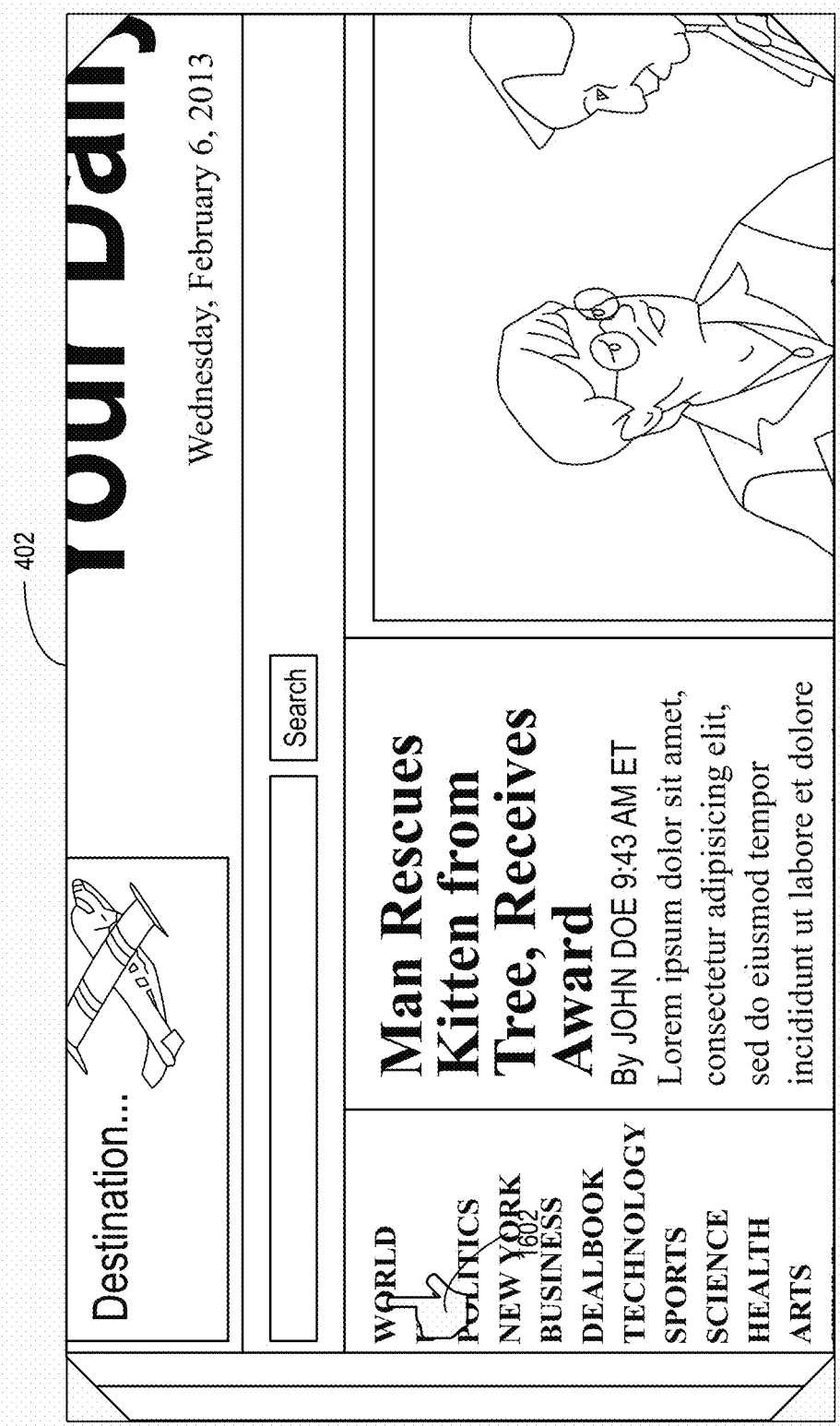

FIGS. 16A-16B illustrate pinning a reticle to a portion of a display of a content during a position-adjusting operation, in accordance with an example embodiment. FIG. 16A is similar to FIG. 11 and depicts a reticle configured to hover over a hyperlink and thus has the shape of a hyperlink hand cursor 1602. As described with respect to FIG. 11, the position and size of the content as depicted in FIG. 16A is changed compared to the position and size depicted in FIG. 4. Upon receiving an indication of ending a position-adjusting operation and/or a size-adjusting operation, the computing device may cause the content to "bounce" back to a different position. FIG. 16B, similar to FIG. 12, depicts the content after the content bounced back to the different position to substantially fill the view region 402. FIG. 16B also depicts that the hand cursor 1602 is pinned to the hyperlink. In this manner, as the position of the content is being changed back from the position depicted in FIG. 16A to the position depicted in FIG. 16B, the hand cursor 1602 moves along with the hyperlink (as if pinned to the hyperlink) Pinning the reticle to the underlying content is not limited to a hyperlink, and can be performed for any type of content. Also, FIGS. 16A-16B illustrate pinning the reticle to the underlying content in the context of position-adjusting; however, pinning the reticle to the underlying type of content can be implemented in the context of size-adjusting as well.

V. CONCLUSION

Where example embodiments involve information related to a person or a device of a person, some embodiments may include privacy controls. Such privacy controls may include, at least, anonymization of device identifiers, transparency and user controls, including functionality that would enable users to modify or delete information relating to the user's use of a product.

Further, in situations in where embodiments discussed herein collect personal information about users, or may make use of personal information, the users may be provided with an opportunity to control whether programs or features collect user information (e.g., information about a user's medical history, social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   generating a display of a content in a view region associated with a computing device, wherein the view region has a given boundary, and wherein the content is provided for display at a first size;
   receiving a size-adjusting input for performing a size-adjusting operation to adjust a size of the content;
   in response to receiving the size-adjusting input, causing the size of the content to change from the first size to a second size, wherein the content in the second size occupies a region that is (i) smaller than the given boundary of the view region, or (ii) larger than the given boundary of the view region such that a portion of the content is beyond the given boundary of the view region and is not rendered;
   receiving an indication that the size-adjusting input has ended; and
   in response to receiving the indication, automatically causing the size of the content to change to a third size that is between the first size and the second size, wherein a boundary of the content having the first size, a boundary of the content having the second size, and a boundary of content having the third size form parallel cross sections along a length of a triangular prism having two opposing triangles connected by trapezoidal sides of the triangular prism.

2. The method of claim 1, wherein the view region is a region of a display coupled to the computing device and having a display plane, and the method further comprises:
   receiving the size-adjusting input at a hand-movement input device associated with the computing device, wherein the size-adjusting input is indicative of a gesture toward the display plane, and wherein:
   causing the size of the content to change from the first size to the second size comprises causing the size of the content to change from the first size to the second size such that the second size is smaller than the first size.

3. The method of claim 1, wherein view region is a region of a display coupled to the computing device and having a display plane, and the method further comprises:
   receiving the size-adjusting input at a hand-movement input device associated with the computing device, wherein the size-adjusting input is indicative of a gesture away from the display plane, and wherein:
   causing the size of the content to change from the first size to the second size comprises causing the size of the content to change from the first size to the second size such that the second size is larger than the first size.

4. The method of claim 1, wherein causing the size of the content to change to the third size comprises:
   causing the size of the content to change to the third size such that at least a given portion of the content substantially occupies the view region.

5. The method of claim 1, further comprising:
   receiving a position-adjusting input relating to a position-adjusting operation for adjusting a position of the content relative to the view region, wherein adjusting the position comprises adjusting one of a horizontal position and a vertical position of the content relative to the view region;
   in response to receiving the position-adjusting input, causing the position of the content to change from a first position to a second position, wherein the content in the second position occupies a region such that a respective portion of the content is beyond the given boundary of the view region and is not displayed;
   receiving an indication of ending the position-adjusting operation; and
   in response to receiving the indication, causing the position of the content to change to a third position.

6. The method of claim 5, wherein the third position is substantially similar to either the first position or the second position.

7. The method of claim 5, wherein the position-adjusting input relates to an input received at a head-movement sensor associated with the computing device.

8. The method of claim 1, further comprising:
generating a display of a reticle to facilitate navigation of the content, wherein the reticle is configured to hover over the content; and
causing a shape of the reticle to change based on a type of content under the reticle.

9. The method of claim 1, further comprising:
generating a display of a reticle to facilitate navigation of the content, wherein the reticle is configured to hover over the content;
receiving an input associated with a hand-movement input device; and
providing for display a menu having at least one selectable item, wherein the at least one selectable item is based on a type of content under the reticle.

10. The method of claim 1, further comprising:
generating a display of a geometric shape, wherein a respective size of the geometric shape changes during the size-adjusting operation and indicates whether the size of the content is increasing or decreasing.

11. A non-transitory computer readable medium having stored thereon instructions that, when executed by a computing device, cause the computing device to perform functions comprising:
generating a display of a content in a view region associated with the computing device, wherein the view region has a given boundary, and wherein the content is provided for display at a first size;
receiving a size-adjusting input for performing a size-adjusting operation to adjust a size of the content;
in response to receiving the size-adjusting input, causing the size of the content to change from the first size to a second size;
receiving an indication that the size-adjusting input has ended; and
in response to receiving the indication, automatically causing the size of the content to change to a third size that is between the first size and the second size, wherein a boundary of the content having the first size, a boundary of the content having the second size, and a boundary of content having the third size form parallel cross sections along a length of a triangular prism having two opposing triangles connected by trapezoidal sides of the triangular prism.

12. The non-transitory computer readable medium of claim 11, wherein the functions further comprise:
generating a display of a geometric shape, wherein a respective size of the geometric shape changes during the size-adjusting operation and indicates whether the size of the content is increasing or decreasing.

13. The non-transitory computer readable medium of claim 11, wherein the functions further comprise:
generating a display of a reticle to facilitate navigation of the content, wherein the reticle is configured to hover over the content; and
causing a shape of the reticle to change based on a type of content under the reticle.

14. A device, comprising:
at least one processor; and
data storage comprising instructions that, when executed by the at least one processor, cause the device to perform functions comprising:
generating a display of a content in a view region associated with the device, wherein the view region has a given boundary, and wherein the content is provided for display at a first size;
receiving a size-adjusting input for performing a size-adjusting operation to adjust a size of the content;
in response to receiving the size-adjusting input, causing the size of the content to change from the first size to a second size, wherein the content in the second size occupies a region that is (i) smaller than the given boundary of the view region, or (ii) larger than the given boundary of the view region such that a portion of the content is beyond the given boundary of the view region and is not displayed;
receiving an indication that the size-adjusting input has ended; and
in response to receiving the indication, automatically causing the size of the content to change to a third size that is between the first size and the second size, wherein a boundary of the content having the first size, a boundary of the content having the second size, and a boundary of content having the third size form parallel cross sections along a length of a triangular prism having two opposing triangles connected by trapezoidal sides of the triangular prism.

15. The device of claim 14, wherein the view region is a region of a display coupled to the device and having a display plane, and wherein the functions further comprise:
receiving the size-adjusting input at a hand-movement input device associated with the computing device;
receiving a position-adjusting input relating to a position-adjusting operation for adjusting a position of the content relative to the view region, wherein adjusting the position comprises adjusting one of a horizontal position and a vertical position of the content relative to the view region, wherein the position-adjusting input relates to an input received at a head-movement sensor associated with the device;
in response to receiving the position-adjusting input, causing the position of the content to change from a first position to a second position, wherein the content in the second position occupies a region such that a respective portion of the content is beyond the given boundary of the view region and is not rendered;
receiving an indication of ending the position-adjusting operation; and
in response to receiving the indication, causing the position of the content to change to a third position.

16. The device of claim 15, wherein the third position is substantially similar to the first position.

17. The device of claim 14, wherein the functions further comprise:
generating a display of a geometric shape, wherein a respective size of the geometric shape changes during the size-adjusting operation and indicates whether the size of the content is increasing or decreasing.

* * * * *